United States Patent
Freed

(10) Patent No.: US 12,533,295 B2
(45) Date of Patent: Jan. 27, 2026

(54) MODULATED WEIGHT REDUCED FERRULE CANISTER

(71) Applicant: Simon Freed, Round Rock, TX (US)

(72) Inventor: Simon Freed, Round Rock, TX (US)

(*) Notice: Subject to any disclaimer, the term of this patent is extended or adjusted under 35 U.S.C. 154(b) by 0 days.

(21) Appl. No.: 18/951,367

(22) Filed: Nov. 18, 2024

(65) Prior Publication Data

US 2025/0073124 A1    Mar. 6, 2025

Related U.S. Application Data

(63) Continuation-in-part of application No. PCT/US2023/022752, filed on May 18, 2023.

(60) Provisional application No. 63/386,783, filed on Dec. 9, 2022, provisional application No. 63/364,940, filed on May 18, 2022.

(51) Int. Cl.
*A61J 1/14* (2023.01)
*G01M 3/10* (2006.01)

(52) U.S. Cl.
CPC ............. *A61J 1/1412* (2013.01); *G01M 3/10* (2013.01)

(58) Field of Classification Search
CPC .................................. A61J 1/1412; G01M 3/10
USPC .......................................................... 422/68.1
See application file for complete search history.

(56) References Cited

U.S. PATENT DOCUMENTS

| | | | |
|---|---|---|---|
| 3,578,758 A * | 5/1971 | Altshuler | G01M 3/202 |
| | | | 73/40.7 |
| 4,284,211 A | 8/1981 | Meshberg | |
| 10,947,030 B2 | 3/2021 | Baker et al. | |
| 2011/0005932 A1* | 1/2011 | Jovanovich | C12Q 1/6806 |
| | | | 204/453 |

(Continued)

FOREIGN PATENT DOCUMENTS

| | | |
|---|---|---|
| FR | 1491146 | 8/1967 |
| JP | 2004099180 A | 4/2004 |

(Continued)

OTHER PUBLICATIONS

Chapter II Demand filed in related International Application No. PCT/US2023/022752, dated Feb. 20, 2024, 77 pages.

(Continued)

*Primary Examiner* — Jill A Warden
*Assistant Examiner* — Jacqueline Brazin
(74) *Attorney, Agent, or Firm* — Thompson Patent Law

(57) ABSTRACT

Apparatus and associated methods relate to a weight reduced ferrule (WRF) pharmaceutical container closure system that consumes less resources while having sufficient tensile strength to sealingly couple a closure to a canister. The pharmaceutical canister may, for example, include a lip extending into a cavity of the container from a distal end of the wall at a predetermined angle. The lip may, for example, define a sealing flat sealing surface extending around an entire perimeter of an aperture into the cavity. The WRF canister may, for example, include a validation method including a placement of a pharmaceutical container within a vacuum chamber including a sensor. The method includes a correlation of a pharmaceutical leakage calibration to the sensor. The method includes a validation determination as a function of the predetermined correlation between a detec- (Continued)

tion of a leaked substance and a weight change in the pharmaceutical canister over a predetermined period.

5 Claims, 36 Drawing Sheets

(56) References Cited

U.S. PATENT DOCUMENTS

2013/0295597 A1* 11/2013 DeWitte ............... G01N 35/026
435/23

FOREIGN PATENT DOCUMENTS

| WO | 2018149472 A1 | 8/2018 |
|---|---|---|
| WO | 2023225208 A1 | 11/2023 |

OTHER PUBLICATIONS

Informal Communications in related International Application No. PCT/US2023/022752, dated Sep. 3, 2024, 3 pages.

International Preliminary Report on Patentability in related International Application No. PCT/US2023/022752, dated Nov. 8, 2024, 76 pages.

International Search Report and Written Opinion of the International Searching Authority in related International Application No. PCT/US2023/022752, dated Sep. 11, 2023, 8 pages.

Response Under Rule 66 filed in related International Application No. PCT/US2023/022752, dated Aug. 26, 2024, 23 pages.

Response Under Rule 66 filed in related International Application No. PCT/US2023/022752, dated May 13, 2024, 81 pages.

Written Opinion of the International Preliminary Examining Authority in related International Application No. PCT/US2023/022752, dated Aug. 12, 2024, 4 pages.

Written Opinion of the International Preliminary Examining Authority in related International Application No. PCT/US2023/022752, dated Mar. 13, 2024, 5 pages.

* cited by examiner

100

335

300

335

MODULATED WEIGHT REDUCED FERRULE CANISTER

CROSS-REFERENCE TO RELATED APPLICATIONS

This application is a continuation of application of PCT application US2023/022752, titled "MODULATED WEIGHT REDUCED FERRULE CANISTER," filed by Simon Freed on May 18, 2023, which claims the benefit of U.S. Provisional Application Ser. No. 63/364,940, titled "Modulated Bottom Profile Ferrule," filed by Simon Freed on May 18, 2022, by reference, and claims the benefit of U.S. Provisional Application Ser. No. 63/386,783, titled "Rapid Pharmaceutical Leakage Detection," filed by Simon Freed, et al., on Dec. 9, 2022.

This application incorporates the entire contents of the foregoing applications herein by reference.

TECHNICAL FIELD

Various embodiments relate generally to ferrules, containers, and sealing verification methods for pharmaceutical and medical devices.

BACKGROUND

Many anesthetic and respiratory drugs are stored in a liquid or dry powder state and used in a vapor or droplet or particle state. In some implementations, the drugs in the liquid state may be more compact for storage. For examples, the anesthetic drugs in the liquid state may be converted into the vapor state through a vaporizer. In some examples, an anesthetic drug storage device may be a container including a bottle with an opening occluded through a valve assembly.

In some examples, a seal between the valve assembly and the bottle may be important in maintaining the liquid anesthetic drug in the container. If the valve assembly and the bottle do not have a fluid-tight seal, the liquid anesthetic drug may escape from the container. A leakage may, for example, be a potential hazard for people in the immediate area around a leaking container. Moreover, if the anesthetic drug is leaking from the container, in operation, a healthcare provider may not be possible to accurately determine the amount of anesthetic remaining in the bottle, leading to other issues (e.g., calculation errors).

Common respiratory diseases including asthma and chronic obstructive pulmonary disease (COPD) affect patients' lungs. Asthma causes symptoms repeated episodes of wheezing, breathlessness, chest tightness, and/or nighttime or early morning coughing. COPD is an obstructive lung disease due to long term damage to a patient's airways of the lungs. Symptoms of COPD may, for example, include shortness of breath; a persistent chesty cough; frequent chest infections, and/or persistent wheezing. Asthma can be treated using medicine. COPD symptoms can be treated with medicine.

Pharmaceutical containers are used to contain medicine to deliver to patients, including those who have asthma. Pharmaceutical containers may include medical package validation protocols. Inhalers may, for example, be used to treat Asthma and/or other respiratory diseases. The inhalers may include metered dosage inhalers (MDI). The inhalers may include dry powder inhalers, soft mist inhalers, and nebulizers. Inhalers are generally used to deliver medicine contained within the inhaler to a patient's lungs.

SUMMARY

Apparatus and associated methods relate to a weight reduced ferrule (WRF) pharmaceutical container closure system that consumes less resources while having sufficient tensile strength to sealingly couple a valve to a canister. The pharmaceutical canister may, for example, include a lip extending into a cavity of the container from a distal end of the wall at a predetermined angle. The lip may, for example, define a sealing flat sealing surface extending around an entire perimeter of an aperture into the cavity. The WRF canister may, for example, include a validation method including a placement of a pharmaceutical container within a vacuum chamber including a sensor. The method includes a correlation of a pharmaceutical leakage calibration to the sensor. The method includes a validation determination as a function of the predetermined correlation between a detection of a leaked substance and a weight change in the pharmaceutical canister over a predetermined period.

In an illustrative example, an anesthetic bottle may include an anesthetic drug container and a valve assembly coupled by the WRF. For example, the WRF may hold the valve assembly against moment force during dispensing into a vaporizer. In some implementations, the WRF may include multiple cutout portions. The cutout portions, for example, be produced by performing a coring processing from a ferrule without the cutout portions. In some examples, scraps resulting from the coring process may be recycled. In some implementations, the cutout portions may provide escape channels between the WRF and the valve assembly to prevent air such that, for example, precision is improved of a leakage test before the WRF is distributed. Various embodiments may advantageously provide an environmentally friendly ferrule.

The WRF may, for example, be manufactured in aluminum. The WRF may, for example, be manufactured in stainless steel. The WRF may, for example, be manufactured in plastic.

In an illustrative example, the lip may, for example, be configured such that, when a cover is disposed to occlude the aperture and coupled to the sealing surface through a sealing member, the sealing surface directly and sealingly contacts a predetermined minimum width of the sealing member around the entire perimeter such that the cavity is sealed against an external environment. The lip may, for example, further extend into the cavity such that the wall supports a side of the lip opposite to the sealing surface.

Various embodiments may achieve one or more advantages. For example, the weight reducing ferrule (WRF) may, for example, reduce manufacturing material costs. For example, the WRF may, for example, allow for increased detection speeds of leakage. For example, the validation method may, for example, save 14-28 day storage costs to validate an inhaler does not have leakage beyond an acceptable level. For example, the exemplary pharmaceutical canister with a lip may, for example, be coupled a WRF. The exemplary pharmaceutical canister may, for example, operate with a ferrule to create effective sealing regions. The effective sealing regions may, for example, ensure the effectiveness of an inhaler in cases of medical emergency. The exemplary pharmaceutical canister may, for example, operate to mitigate risk to patients concerning sealing effectiveness.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, to help introduce discussion of various embodiments, an illustrative use-case scenario of a weight reduced ferrule (WRF) canister system introduced with reference to FIG. 1. Second, that introduction leads into a cross-sectional WRF canister description with reference to FIG. 2. Third, with reference to FIGS. 3A-B, an exemplary weight reduced ferrule employed in an illustrative use-case scenario. Fourth, with reference to FIGS. 4A-8 depict an exemplary WRF. Fifth, with reference to FIG. 9A-9C, depicts an exemplary pharmaceutical canister. Sixth, concerning FIGS. 10-12 this document describes an exemplary system diagram and exemplary validation and validation criterium. Sixth, with reference to FIGS. 13-14F depict an assembly view of a pharmaceutical canister with a WRF and exemplary subparts are shown. Finally, with respect to FIG. 15, an exemplary method to generate an exemplary spectrometer calibration profile is depicted. FIGS. 16A-18 depict an exemplary conical gasket.

Figure 1:
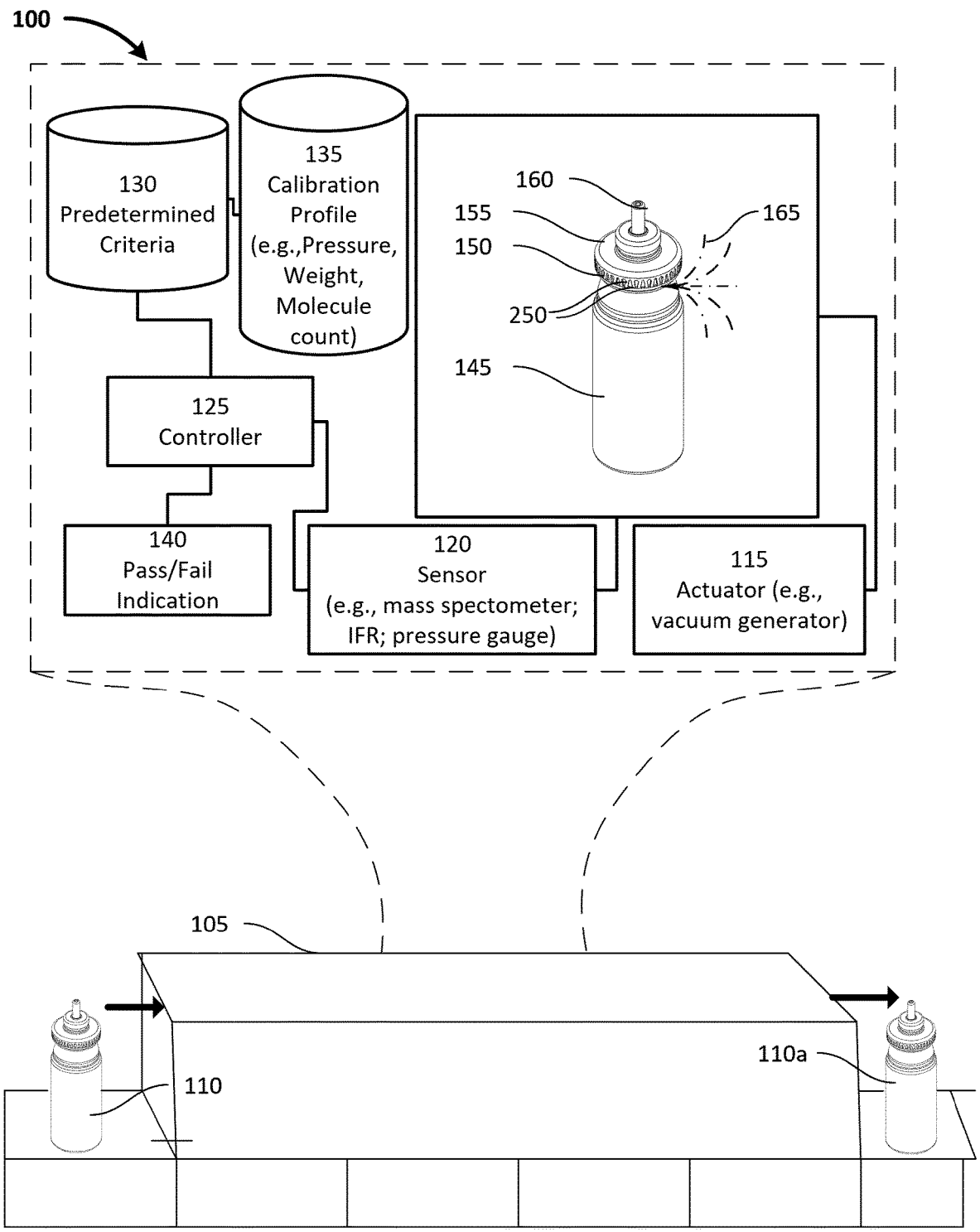
FIG. 1 depicts an exemplary weight reduced ferrule (WRF), exemplary pharmaceutical canister, and exemplary validation method employed in an illustrative use-case scenario.

FIG. 1 depicts an exemplary weight reduced ferrule (WRF), exemplary pharmaceutical canister, and exemplary validation method employed in an illustrative use-case scenario 100. The illustrative use-case scenario 100 includes an exemplary validation mechanism 105. The illustrative use-case scenario 100 includes an exemplary pharmaceutical container 110. The pharmaceutical container may, for example, include a pharmaceutical canister. The pharmaceutical container may, for example, include a "Modulated Bottom Profile Ferrule" as disclosed in U.S. Provisional Application Ser. No. 63/364,940, titled "Modulated Bottom Profile Ferrule," filed by Simon Freed on May 18, 2022. The pharmaceutical canister may, for example, be coupled with a WRF. The illustrative use-case scenario 100 includes an exemplary pharmaceutical container 110a with a pass or fail indication.

The validation mechanism 105 includes an actuator 115. The actuator may, for example, include a vacuum generation mechanism. The vacuum generation mechanism may, for example, include a vacuum pump. The actuator may, for example, act to remove air from sections of the validation mechanism.

The validation mechanism 105 includes sensor technology 120. The sensor technology may, for example, include a mass spectrometer. The mass spectrometer may, for example, include a micro mass spectrometer. The sensor may, for example, include laser technology. The laser technology may, for example, include infrared lasers. The sensor technology may, for example, include a pressure gauge. The pressure gauge may, for example, serve to measure the amount pressure within the vacuum chamber to detect leaking gas. The mass spectrometer may, for example, measure the amount of moles and/or molecule count of a substance within the vacuum chamber of gas. The infrared lasers may, for example, measure the number of moles and/or molecule count of a substance within the vacuum chamber.

The validation mechanism may, for example, include an assembly line. The validation mechanism may, for example, examine one or more pharmaceutical containers at a time. The validation may, for example, examine batches of pharmaceutical containers. The validation method may, for example includes a "Rapid Pharmaceutical Leakage detection" method as disclosed in U.S. Provisional Application Ser. No. 63/386,783, titled "Rapid Pharmaceutical Leakage detection," method filed by Simon Freed on Dec. 9, 2022.

The validation mechanism 105 includes a controller 125. The controller may, for example, include a computer processor. The controller 125 connects to a predetermined criterium 130. The predetermined criteria may, for example, be to correlate the input from the sensors to a weight output.

The controller 125 connect to a calibration 135 profile that correlates the input data from the sensors to an output. The output may, for example, be used to detect leakage. The output may, for example, be used to detect mass flow leaking from the pharmaceutical container.

The controller 125 may, for example, use the output to determine a pass or fail indication 140. The indication may, for example, applied to individual canisters. The indication may, for example, be applied to groups of containers. The indication may, for example, be applied to batches of containers. The indication may, for example, be applied rapidly to groups of canister.

For example, one canister group may, for example, be examined. The one canister group may then be removed from the validation mechanism to allow a second canister group to be examined. Labels may, for example, be applied to the canisters based on a pass or fail indication. Individual cans and/or batches may, for example, be tracked with an identification mechanism such as a bar code and/or quick response code.

FIG. 2 depicts an exemplary cross-section 200 of a modulated bottom profile ferrule canister employed in an illustrative use-case scenario. The pharmaceutical container 110 includes a pharmaceutical canister 145. The cross-section 200 includes a cavity 205. The cavity extends along a longitudinal axis 210. The cavity is defined by a wall 215.

In FIG. 1, the pharmaceutical canister 145 includes a coupling mechanism 150. The coupling mechanism 150 couples to the weight reduced ferrule (WRF) 155. The coupling mechanism may, for example, be part of the pharmaceutical canister. The coupling mechanism may, for example, include a wall of the pharmaceutical canister. The coupling mechanism may, for example, include a lip of the pharmaceutical canister. The coupling mechanism may, for example, include an area where the cavity couples to the WRF.

The pharmaceutical canister may, for example, include a lip extending into the cavity from a distal end of the wall at a predetermined angle 220. The predetermined angle may, for example, be represented by theta in FIG. 2. The lip may, for example, define a sealing flat sealing surface extending around an entire perimeter of an aperture into the cavity. The lip may, for example, be configured such that, when a cover is disposed to occlude the aperture and coupled to the sealing surface through a sealing member, the sealing surface directly and sealingly contacts a predetermined minimum width of the sealing member around the entire perimeter such that the cavity is sealed against an external environment. The lip may, for example, further extend into the cavity such that the wall supports a side of the lip opposite to the sealing surface.

The pharmaceutical container 110 includes a WRF that includes a lip. The WRF 155 circumscribes a valve 160.

The illustrative use-case scenario 100 includes a leak 165. The leak may, for example, include gas particles from the container. The pharmaceutical container may, for example, include a leak from a faulty coupling. The pharmaceutical container may, for example, include a leak from a puncture. The pharmaceutical container may, for example, have a leak from an impact. The pharmaceutical container may, for example, have a leak from vibrations causing it to cyclically impact over an extended period of time causing injury to the pharmaceutical container.

The leak may, for example, be detected by the sensor. The actuator may, for example, remove all gases but for gas being inputed into the system. The pressure differential between the vacuum and the can may, for example, create a leak such that if the container was not sealed properly the container would release gas. The sensor may, for example, detect the gas because no other gas exists in the chamber but for gas that was leaked into the chamber. The sensor may, for example, include a mass spectrometer. The sensor may, for example, include an infrared laser sensor. The sensor may, for example, include a pressure gauge.

The controller may, for example, include an analysis engine. The analysis engine may, for example, include software. The software may, for example, operate differently based on the type of sensor. The software may, for example, operate differently based on the set-up of the validation of the pharmaceutical canister. The software may, for example, The software may, for example, operate based on a set of predetermined criteria. The predetermined criteria may, for example, include a previous equivalence testing ratio. The predetermined criteria may, for example, include the dimensions of the canister. the predetermined criteria may, for example, include the chemical make up of the medicine contained within the can. The predetermined criteria may, for example, include the type of propellant within the pharmaceutical canister. The predetermined criteria may, for example, include the internal pressure within the canister. The predetermined criteria may, for example, include the type of actuator. The predetermined criteria may, for example, include the type of sensor.

The calibration profile may, for example, include a predetermined calculation based on the pressure of the chamber. The calibration profile include a predetermined calculation based on the weight of the canister. The calibration profile may, for example, include a predetermined calculation based on the amount of molecules in moles detected by the sensors.

Figure 2A:
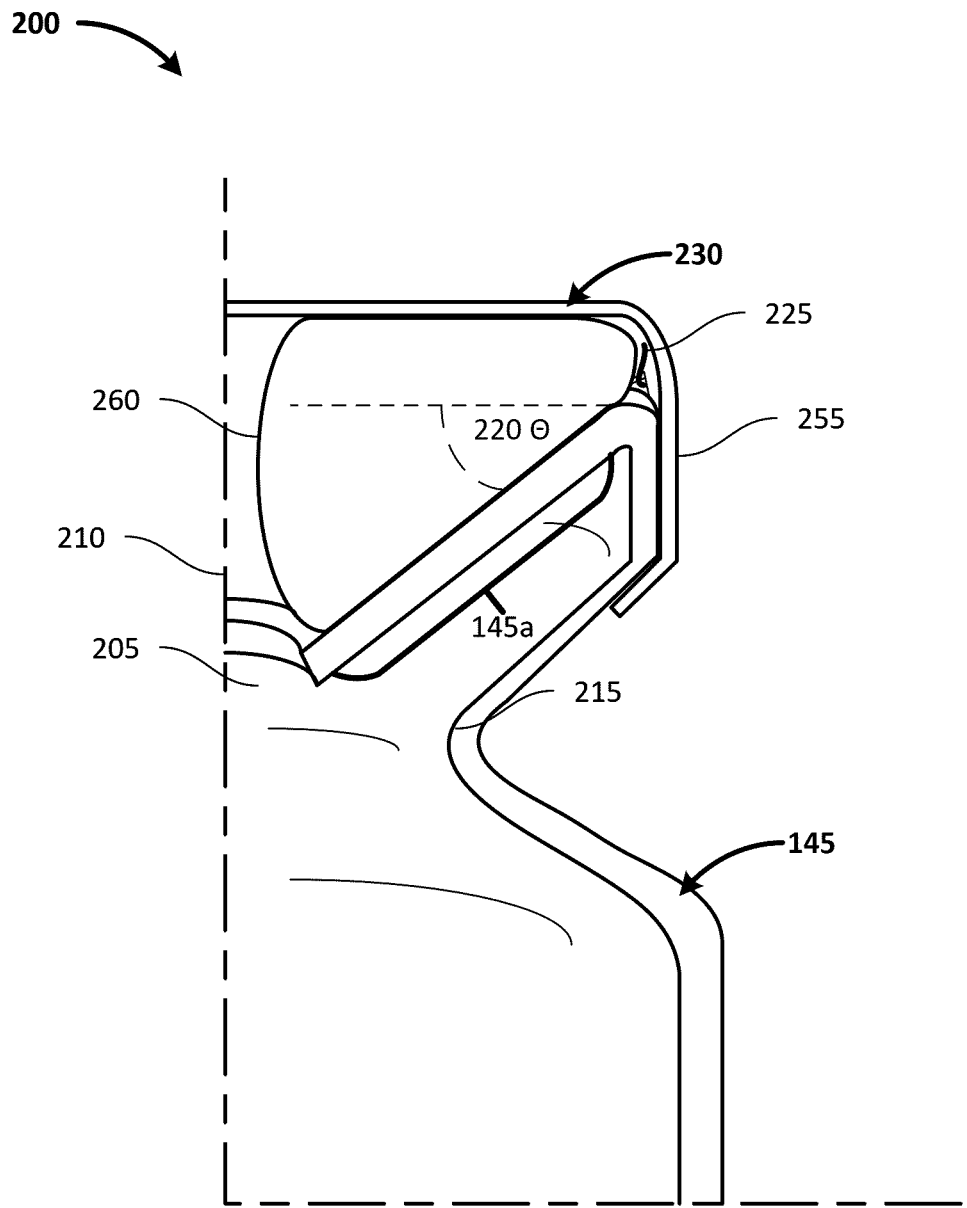
FIG. 2A depicts an exemplary cross-section of a WRF canister employed in an illustrative use-case scenario.

The cross section 200 of a pharmaceutical canister 145 in FIG. 2A. The pharmaceutical canister 145 includes a lip 145a. The cross section 200 includes a valve 160. The valve 160 is circumscribed by a WRF 230. A gas 225 is leaking from the valve 160. The gas may, for example, include propellant. gas is leaking from a valve 160. The gas is guided to predetermined curvilinear path 255 through the WRF. The guided path may, for example, be used for detection by a sensor. The sensor may, for example, include a micro spectrometer placed such that it detects leaks near the edge of the perimeter of the WRF.

Figure 2B:
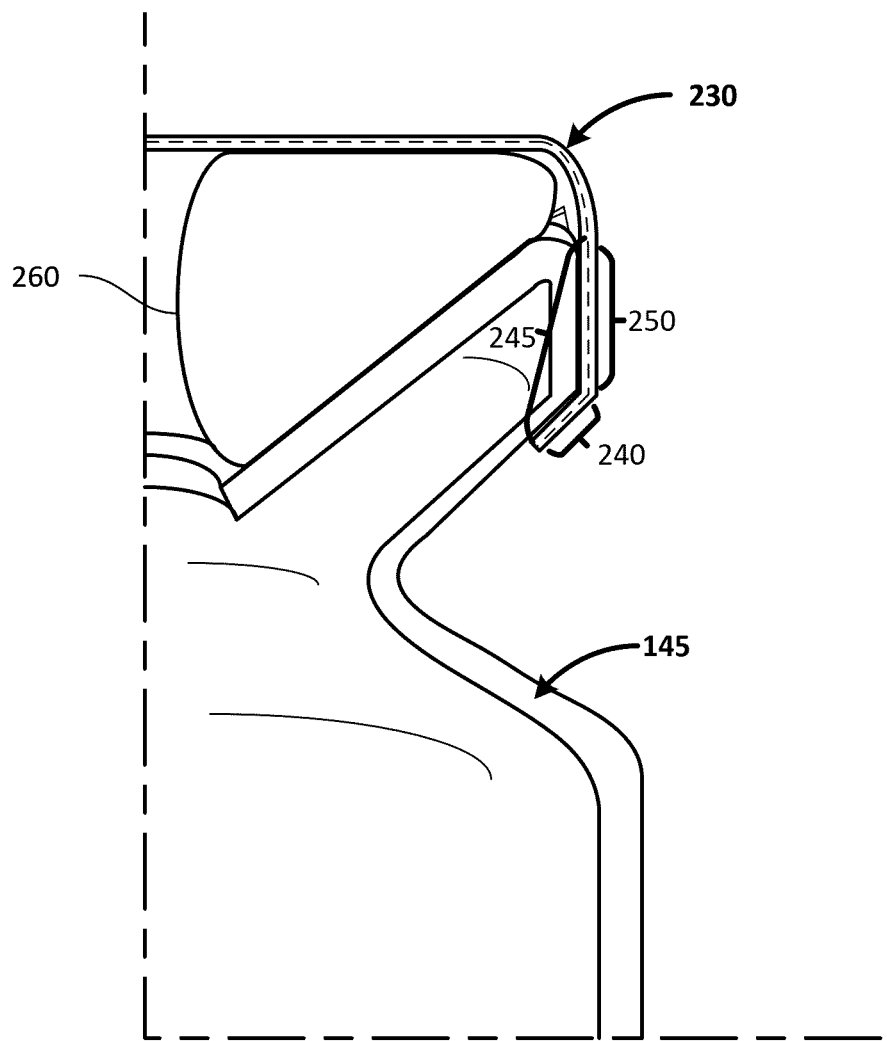
FIG. 2B depicts an exemplary cross-section of a WRF employed in an illustrative use-case scenario.

FIG. 2B depicts an illustrative use case scenario involving a WRF 230. The WRF 230 includes a sealing region 235. The illustrative use-case scenario includes a valve 160. The illustrative use-case scenario includes a pharmaceutical container 145. The sealing region 235 includes an upper boundary 235a. The sealing region 235 includes a lower boundary 235b.

The WRF 230 includes an engagement region 240. The engagement region 240 is configured to couple the pharmaceutical container 145 to the WRF 230. The pharmaceutical container 145 may, for example, include a bottle. The WRF 230 includes a coupling region 245. The coupling region includes multiple tension members 250.

Each tension member may, for example, extend along a curvilinear path 255 to connect the engagement region 240 to the sealing region 235.

The multiple tension members are configured such that, when the engagement region is coupled to the bottle and the coupling region is coupled to the valve, a tensile strength of the multiple tension members between the engagement region and the coupling region is at least equal to a predetermined value sufficient to retain the valve to the pharmaceutical container.

Figure 3A:
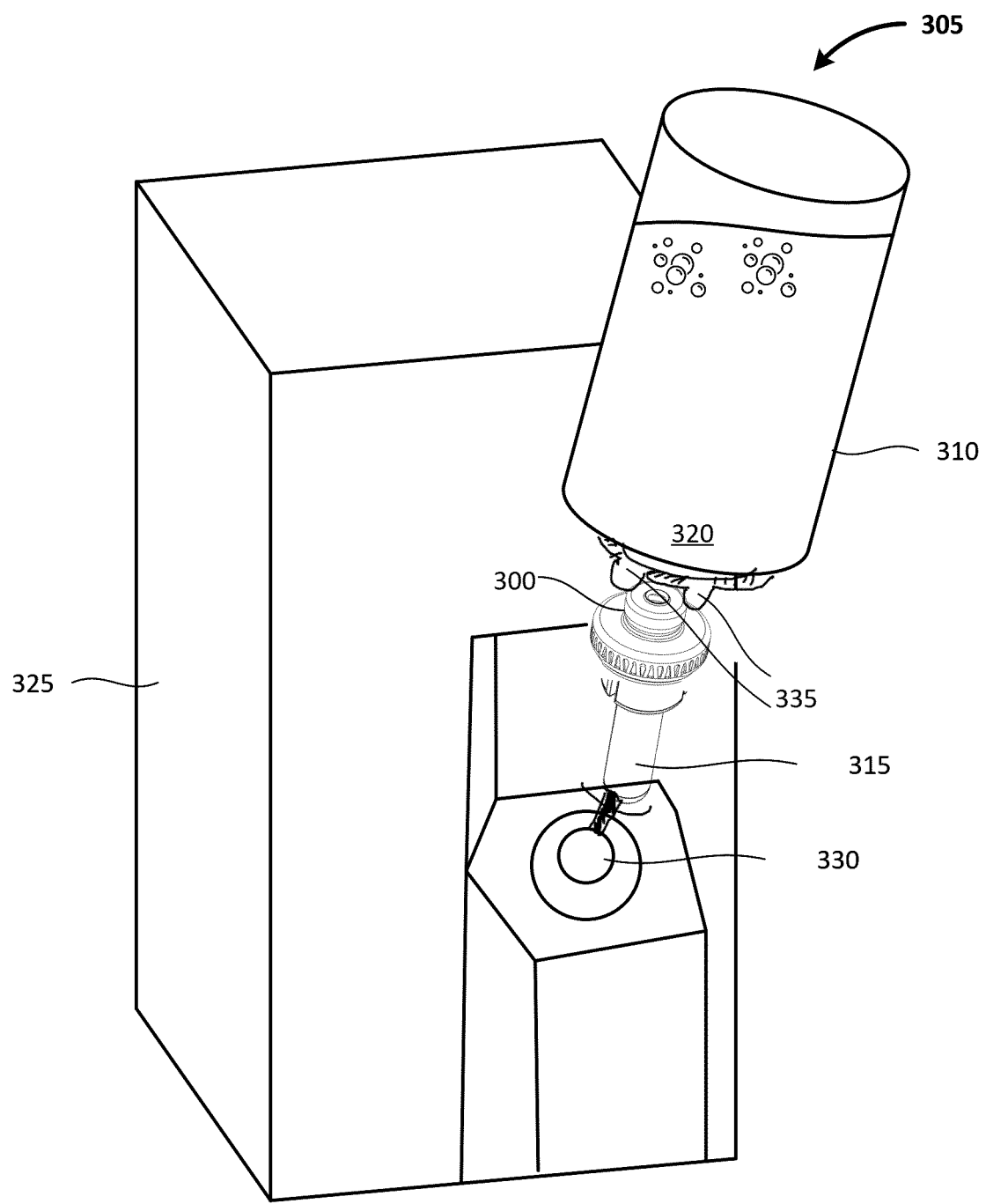
FIG. 3A depicts an exemplary WRF employed in an illustrative use-case scenario.

FIG. 3A depicts an exemplary weight reduced ferrule (WRF 300) employed in an illustrative use-case scenario. In this example, an anesthetic drug bottle 305 includes an anesthetic container 310, and a valve assembly 315. The anesthetic container 310 may contain anesthetic drug 320 in liquid form, for example. In some examples, the anesthetic drug 320 may be in gaseous state at room temperature. Inside the anesthetic container 310 the anesthetic drug 320 may be pressured to be in liquate state, having a boiling point above room temperature (e.g., at 92° F.). For example, the valve assembly 315 may be configured to maintain a predetermined pressure within the anesthetic container 310 and prevent the anesthetic drug 320 from escaping from the anesthetic drug bottle 305.

As shown, the WRF 300 couples the valve assembly 315 to the anesthetic container 310. In some implementations, the WRF 300 may be crimped onto a neck of the anesthetic container 310, securing the valve assembly 315 to the anesthetic container 310. In some implementations, the anesthetic drug 320 may, in at least some cases, have a relatively low boiling point that the anesthetic drug 320 inside the anesthetic container 310 may be in both liquid and gaseous states. For example, the anesthetic drug 320 in gas state may exert a pressure against the valve assembly 315 to escape from the anesthetic drug bottle 305.

In some implementations, the WRF 300 may be at least partially made of metal (e.g., aluminum). In some embodiments, the WRF 300 may, for example, be at least partially made of plastic. In some examples, the WRF 300 may be configured to have a weight and tensile strength to secure the valve assembly 315 in place to prevent escaping of the anesthetic drug 320.

The container 310 may, for example, be constructed of metal (e.g., aluminum). In some implementations, the container 310 may be constructed, for example, of glass. In some implementations, the container 310 may, for example, be constructed of plastic.

As an illustrative example, in operation, a vaporizer 325 may be used to meter and dispense the drug to a patient. In some implementations, the vaporizer 325 may also heat the anesthetic drug to body temperature. In this example, to dispense the anesthetic drug 320 into the vaporizer 325, the valve assembly 315 is being inserted into a vaporizer filling port 330 of the vaporizer 325. In some implementations, the vaporizer filling port 330 may include fastening mechanisms for secure the anesthetic drug bottle 305 to the vaporizer 325. For example, the anesthetic drug bottle 305 may be secured to the vaporizer 325 by, after inserting the valve assembly 315 into the vaporizer filling port 330, rotating upward to open an entrance to the vaporizer filling port 330 allowing the anesthetic drug 320 to fill the vaporizer filling port 330.

As shown in FIG. 3A, the WRF 300 includes modulated bottom profile 335. For example, the modulated bottom profile 335 may be scallop shaped. In some implementations, the modulated bottom profile 335 may advantageously reduce false leakage failure at a testing stage in a production process of the anesthetic drug bottle 305. In some examples, the modulated bottom profile 335 may save raw materials to advantageously reduce total material used for making the WRF 300. In some examples, the saved materials may be sold in scarp market for a price higher than used scarp.

For example, many people recognize a need to develop goods using minimum amount of earth's natural resources. In some examples, environmentally friendly may indicate whether a product is less wasteful than other products. In an environmentally unfriendly aspect, waste may not be recycled but rather may, for example, be incinerated and/or sent to dumps rather than recycling. For example, used anesthetic bottles and/or ferrules may, for example, often be disposed of as medical waste. For example, the medical waste may not be recycled due to safety concerns. On the other hand, raw materials for making anesthetic bottles may be expensive. Pre-production material scrap for the anesthetic bottles may have a premium price in the scrap market as it may, for example, be easily recyclable.

In various implementations, the WRF 300 with the modulated bottom profile 335 may be configured to have tensile strength enough to retain the valve assembly 315 to the anesthetic container 310, preventing it from being blown off by a pressure difference between inside of the anesthetic container 310 and the vaporizer 325. For example, the WRF 300 may advantageously be strong enough to allow the anesthetic container 310 and the valve assembly 315 to open the vaporizer filling port 330. For example, the WRF 300 may be a fulcrum point of the anesthetic container 310 with the attached valve assembly 315 against shifting or dislodging. For example, the WRF 300 may be strong enough to resist a moment force exert on the valve assembly 315 during dispensing.

As an illustrative example, the anesthetic drug bottle 305 may require a predetermined tensile strength based on, for example, a pressure of the anesthetic drug 320 within the anesthetic container 310. In some implementations, the modulated bottom profile 335 may be configured to provide the WRF 300 with minimal weight while having at least the predetermined tensile strength to secure the valve assembly 315 during dispensing of the anesthetic drug 320.

Figure 3B:
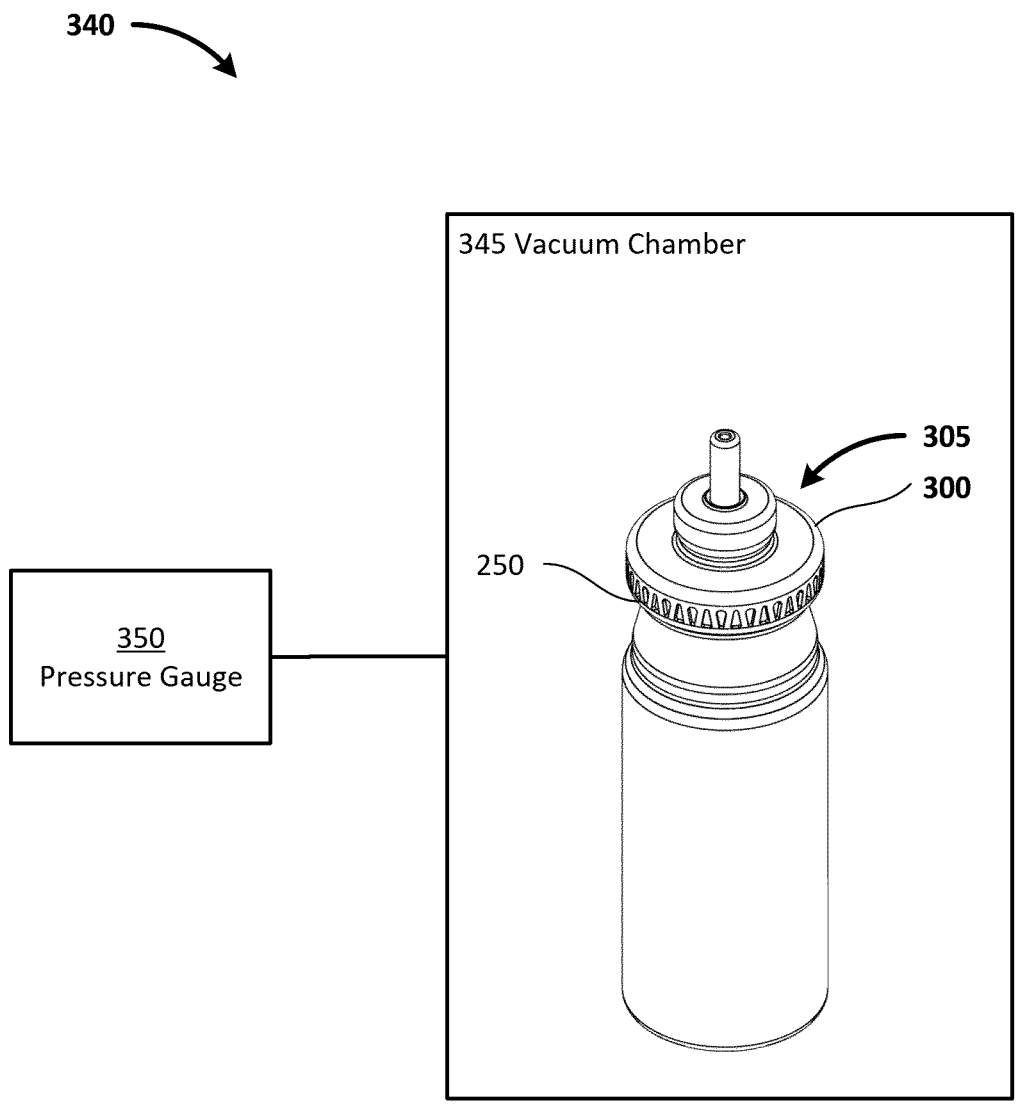
FIG. 3B depicts an exemplary WRF employed in an illustrative use-case scenario.

FIG. 3B is a block diagram showing an exemplary WRF testing system 340. For example, the WRF 300 may be tested for leakage before being shipped out. For example, the WRF testing system 340 may be part of a quality control to prevent leaking anesthetic bottles to be distributed. In some examples, the WRF testing system 340 may be performed after the anesthetic bottle 305 is filled.

In this example, the WRF testing system 340 includes a vacuum chamber 345 and a pressure gauge 350. For example, air in the vacuum chamber 345 may undergo an evacuation process. For example, during the evacuation process, air be evacuated. In some implementations, a pressure within the vacuum chamber 345 may be reduced from normal pressure to approximately 8 pounds per square inch. For example, the WRF testing system 340 may then permitted to stabilize for a predetermined period of time (e.g., 2-3 seconds). After the predetermined period of time, the pressure gauge 350 may measure a pressure in the vacuum chamber 345. In some examples, any vacuum decay within the vacuum chamber 345 may indicate that gas from the anesthetic bottle 305 may be escaped, resulting in a pressure rise within the chamber.

In some implementations, the WRF 300 having the modulated bottom profile 335 may advantageously improve precision of the WRF testing system 340 by preventing air to be trapped within the WRF 300 in a vacuum environment. For example, when the vacuum chamber 345 is activated, the modulated bottom profile 335 may allow a pressure in a cavity between the housing of the WRF 300 and the valve assembly 315 to be equal to a pressure of the vacuum chamber 345. In various examples, the modulated bottom profile 335 may advantageously save a number of anesthetic drug bottles with false leakage measurement from being scrapped. For example, the saved anesthetic drug bottles may reduce waste and improve financial costs.

Figure 4A:
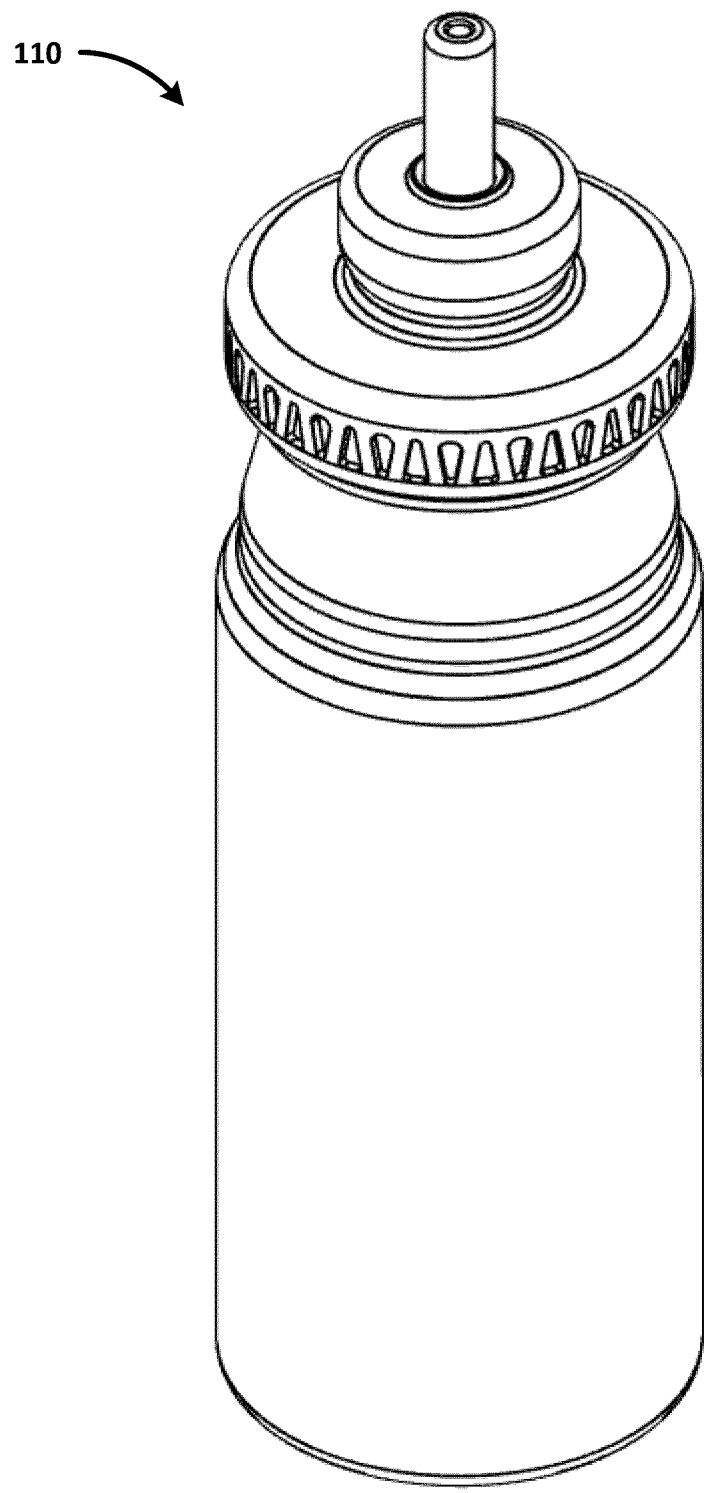
FIG. 4A depicts an exemplary WRF canister.
Figure 4B:
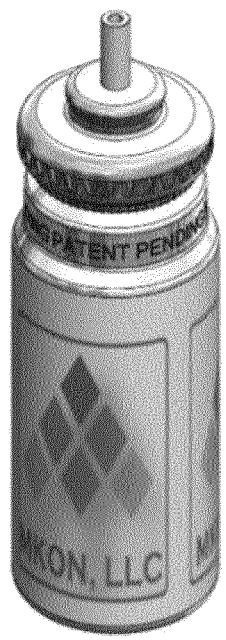
FIG. 4B depicts an exemplary WRF in a perspective view.
Figure 4C:
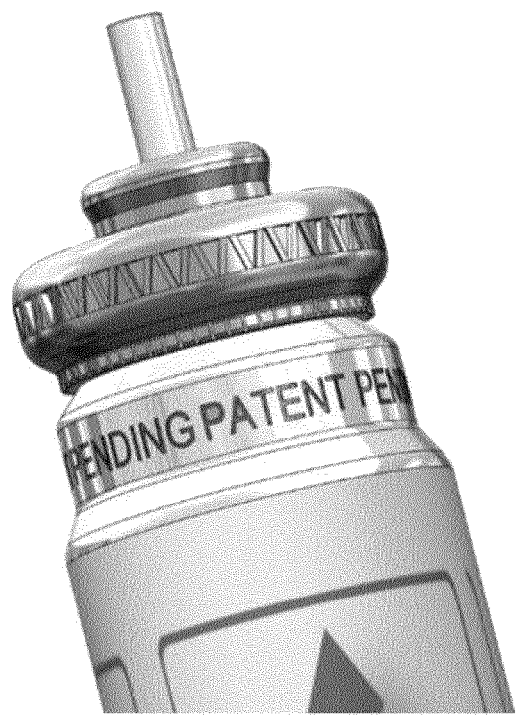
FIG. 4C depicts an exemplary WRF in a close-up view.
Figure 4D:
FIG. 4D depicts an exemplary pharmaceutical container in a perspective view.
Figure 4E:
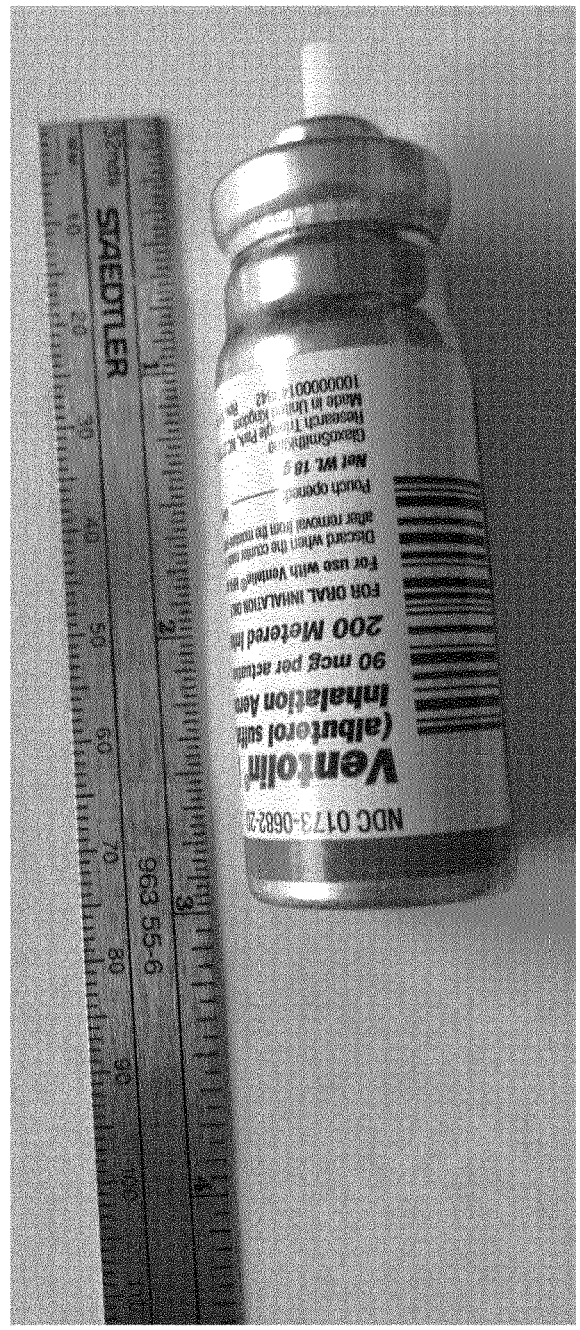
FIG. 4E depicts an exemplary pharmaceutical container in a side view.

FIG. 4A-4H depicts an exemplary WRF canister perspectives. FIG. 4A includes a model of a pharmaceutical canister including a WRF. FIG. 4B includes a model of an exemplary pharmaceutical canister including a WRF. FIG. 4C includes a close up view of an exemplary WRF used in conjunction with a canister. FIG. 4D include an exemplary view of a canister without a WRF. FIG. 4E includes a view of a canister pictured with a ruler to show exemplary measurements of the canister. The pharmaceutical canister may, for example, include a length dimension of 3inches. The circumference may, for example, include a diameter of 1.5 inches. The circumference may, for example, include a diameter of 2 inches. The circumference may, for example, include a diameter of 1.25 inches. The circumference may, for example, include a diameter of 1 inch.

The pharmaceutical canister may, for example, fit within a person's pocket. The pharmaceutical canister may, for example, fit in a person's purse.

Figure 4F:
FIG. 4F depicts an exemplary valve and dispenser assembly.
Figure 4G:
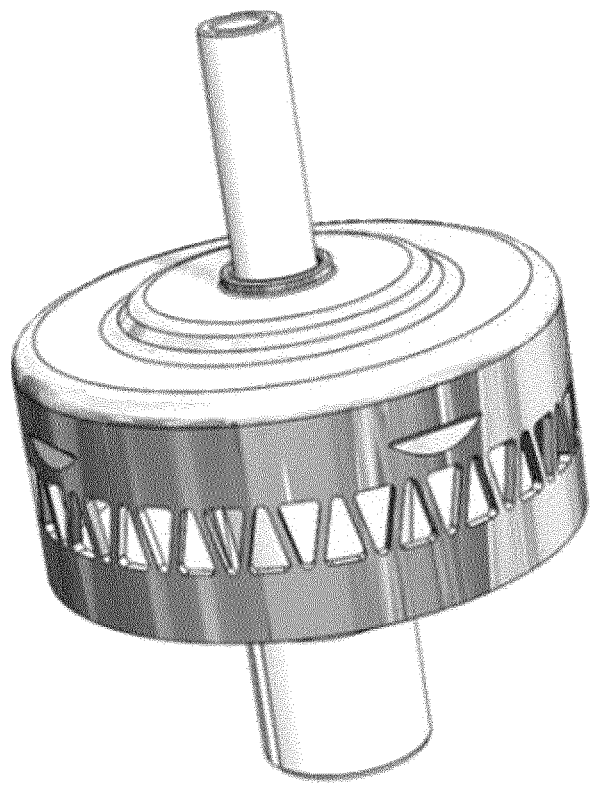
FIG. 4G depicts an exemplary WRF circumscribing a valve.
Figure 4H:
FIG. 4H depicts an exemplary WRF canister.

FIG. 4F depicts an exemplary dispenser cap. FIG. 4G depicts an exemplary valve. The exemplary valve may, for example, be coupled to the exemplary cap dispenser to dispense the propellant. FIG. 4H depicts an exemplary pharmaceutical canister.

Figure 5A:
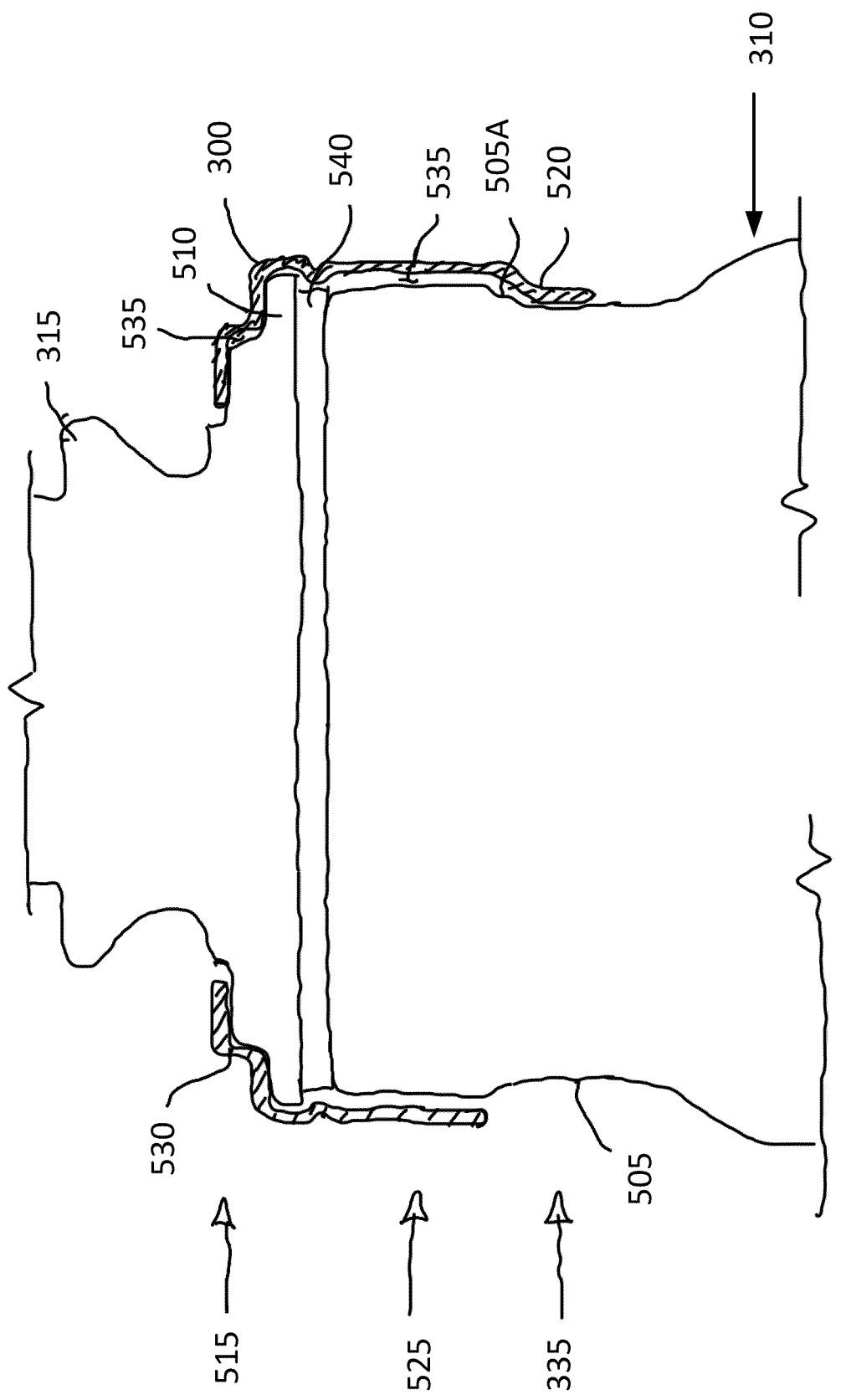
FIG. 5A depicts an exemplary WRF.
Figure 5B:
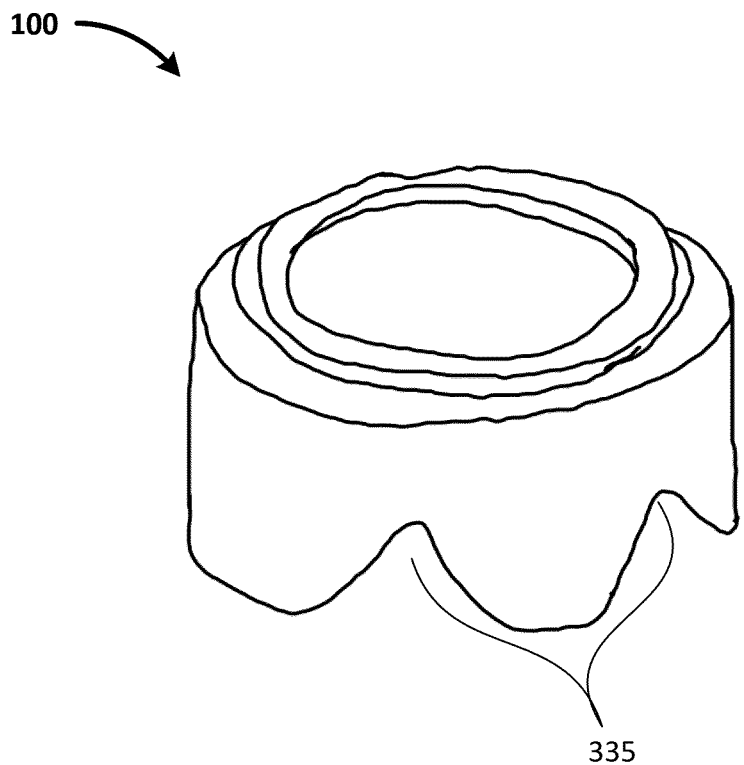
FIG. 5B depicts an exemplary WRF in a perspective view.

FIG. 5A shows a perspective view of an exemplary WRF 500 having the modulated bottom profile 335. FIG. 5B shows an elevated view of an exemplary WRF 300 having the modulated bottom profile 335. In the depicted example, the WRF 300 is provided with a continuous ferrule wall having a modulated bottom profile 335.

Figure 5C:
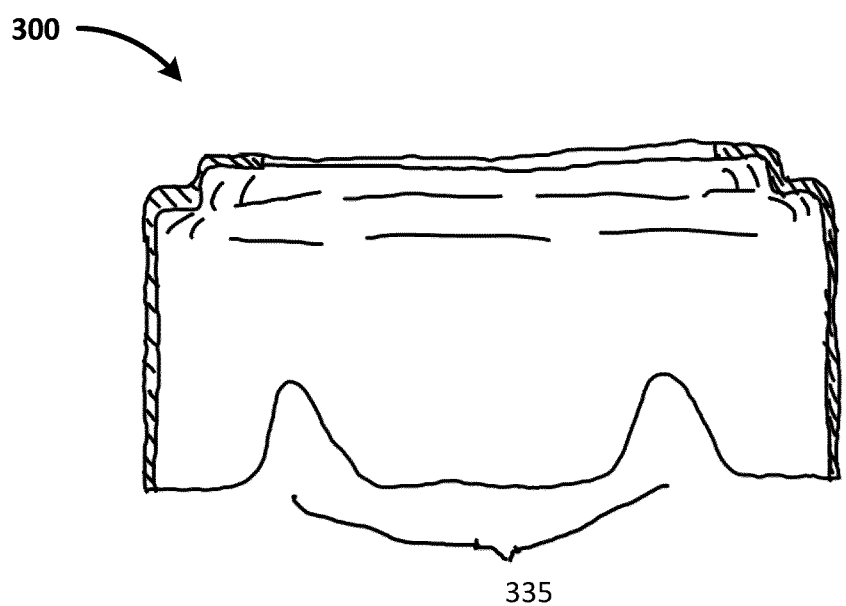
FIG. 5C depicts an cross section diagram of an exemplary WRF in a side view.

FIG. 5C is a cross-section diagram showing an exemplary WRF 300 coupled to an anesthetic container 310 and a valve assembly 315. As shown, the WRF 300 is disposed about a bottle neck 505 of the anesthetic container 310 and over and about a flange 510 of the valve assembly 315 to couple the valve assembly 315 to the anesthetic container 310. In the depicted example, the WRF 300 sealingly couples the flange 510 against the container 310 via holding a sealing member 540 in compression between the flange 510 and the container 310.

In this example, the WRF includes a first end 515 through which at least a portion of the valve assembly 315 depends, a second end 520 through which the anesthetic container 310 depends, and a central region 525 between the first end 515 and the second end 520. The first end 515 may have one or more shoulders 530 that are designed to couple to the flange 510 of the valve assembly 315. During a coupling process, the second end 520 of the WRF 300 may couple, for example, with the bottle neck 505 to secure the valve assembly 315 to the anesthetic container 310.

In the depicted example, "lobes" formed by the modulated bottom profile 335 form the second end 520 and engage an undercut 505A of the bottle neck 505. The upper portion of the modulated bottom profile 335, in the illustrative example shown, does not extend below the undercut 505A. For example, by not completely encircling the bottle neck at a crimped region engaging the undercut 505A, the WRF 300 may, for example, advantageously prevent trapping of air between the ferrule and the container 310 and/or the valve assembly 315.

As shown, when the WRF 300 is coupled to the anesthetic container 310, a cavity 535 is formed between an outer surface the anesthetic container 310 and an inner surface of the WRF 300 and/or between the inner surface of the WRF 300 and an outer surface of the valve assembly 315. The cavity 535 may, if the ferrule was continuous, entrap air in the cavity 535 during the crimping process. Accordingly, the modulated bottom profile 335 may advantageously prevent entrapment of air in the cavity 535. During the evacuation process of the WRF testing system 340 as described with reference to FIG. 5B, then the modulated bottom profile 335 may advantageously reduce a number of false rejects by preventing entrapment of air. The modulated bottom profile 335 may, for example, prevent entrapment of air by creating a discontinuous (e.g., interrupted) engagement with the bottle neck 505 (e.g., at least with the undercut of the bottle neck 505).

Figure 5D:
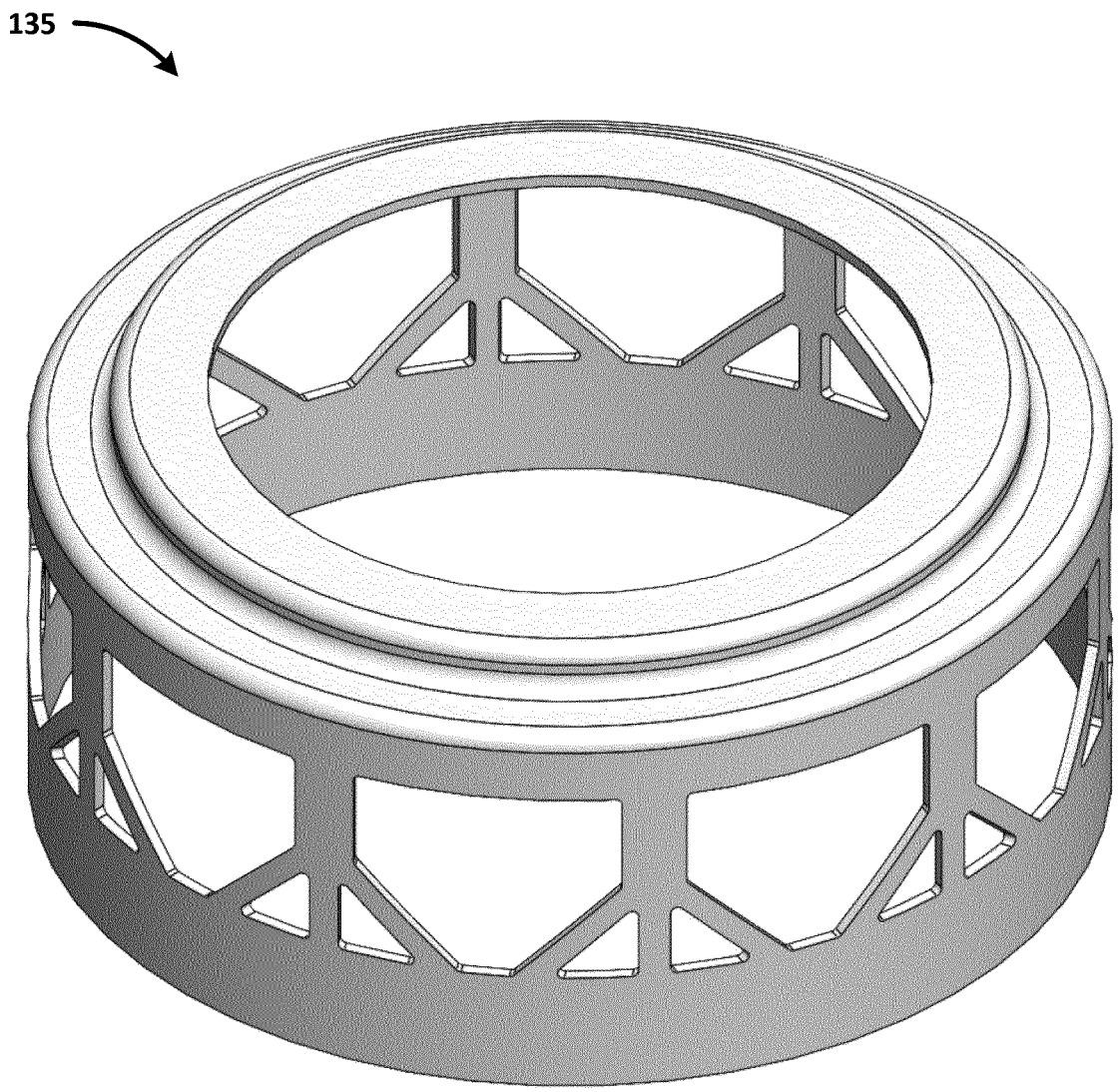
FIG. 5D depicts an exemplary WRF in a perspective view.
Figure 5E:
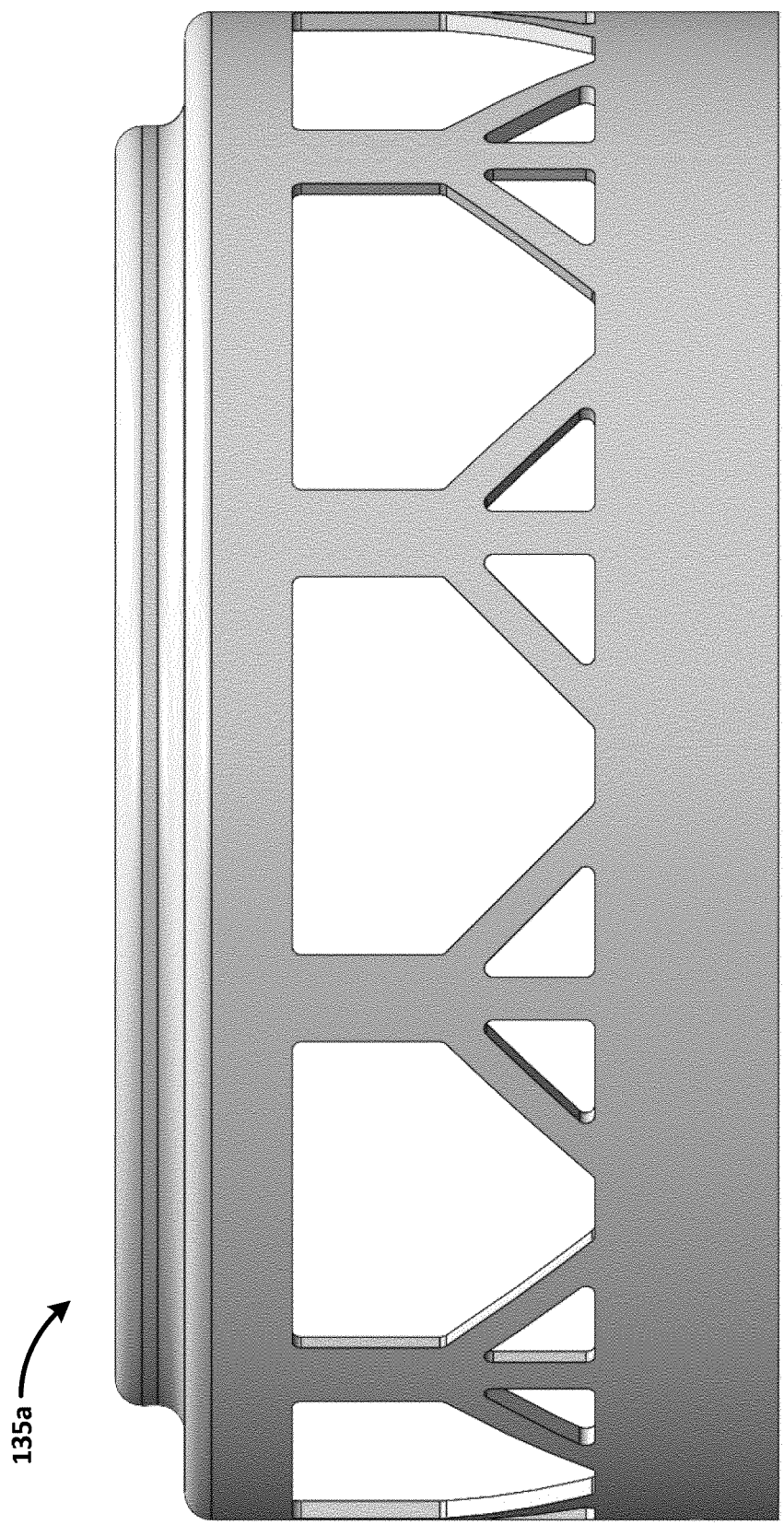
FIG. 5E depicts an exemplary WRF in a side view.

FIG. 5D depicts an exemplary meshed WRF 135. FIG. 5E depicts a meshed WRF 135a side wall. In some implementations, the meshed WRF 135a may be produced by coring away materials from an unmeshed ferrule. In some examples, the meshed WRF 135a may advantageously allow a scrap cut from a core to be recycled. In some implementations, the meshed WRF 135a may be produced by a coring away manufacturing process. For example, the coring away manufacturing process may be performed when aluminum sheet for making the WRF 135 is still flat. For example, the aluminum sheet may be processed before it is work hardened in, for example, a disk deep drawing process. For example, in the coring away manufacturing process, the scrap may be produced at no additional cost other than additional hard tooling change to produce a stamping die for a mesh pattern. In some implementations, the meshed WRF 135a may be configured to maximally reduce a weight of a ferrule before coring while having at least a predetermined tensile strength to hold the valve assembly 315 to the anesthetic container 310 during dispensing of the anesthetic drug 320.

Figure 5F:
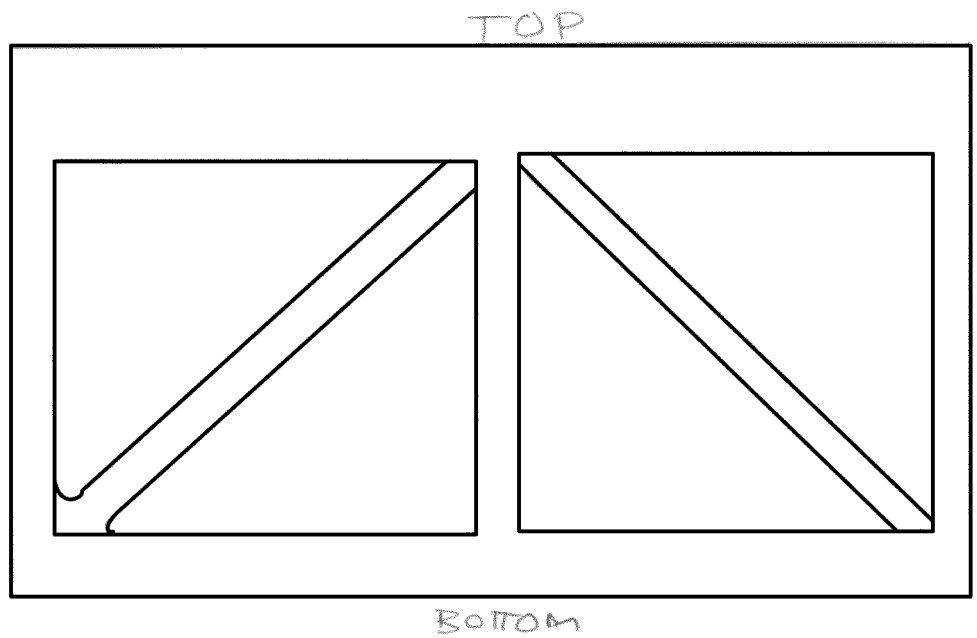
FIG. 5F depicts an exemplary WRF schematic in a side view.
Figure 6A:
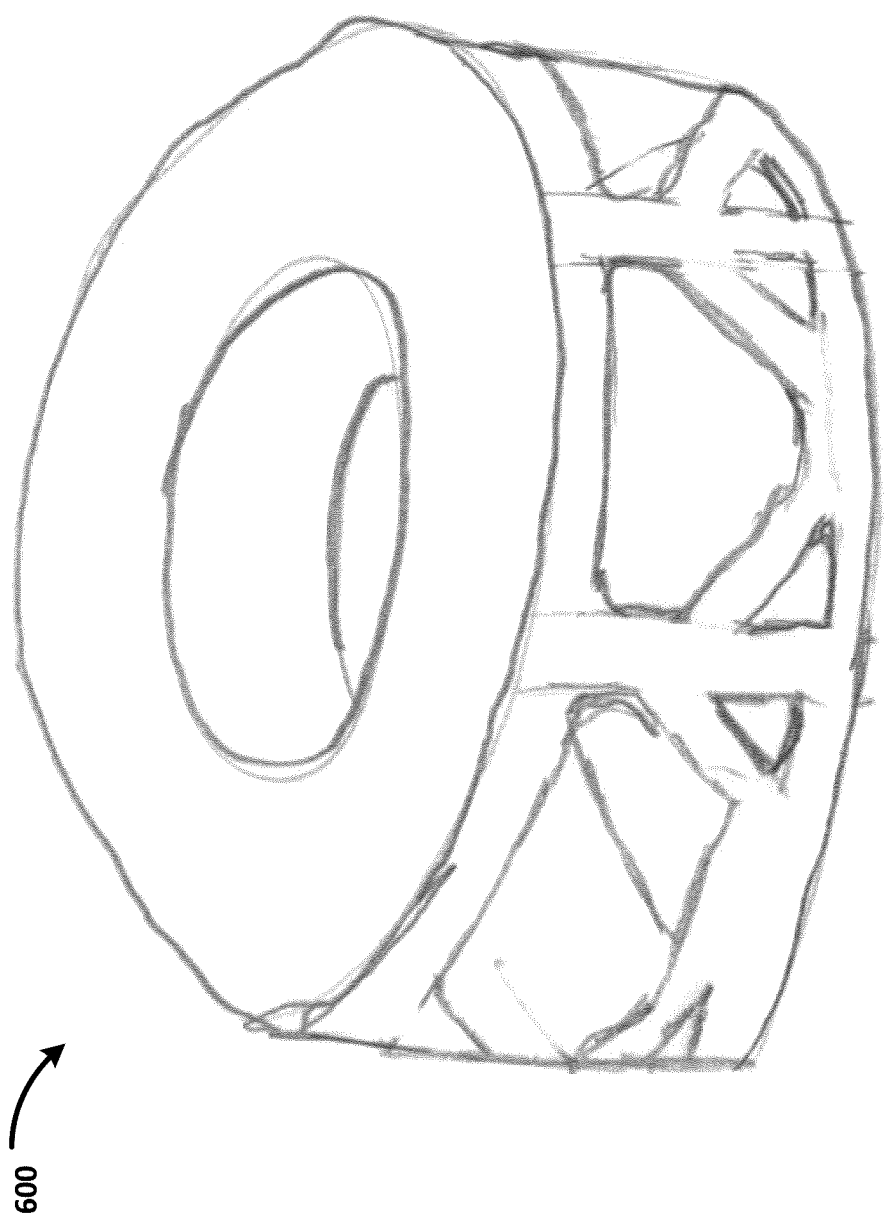
FIG. 6A depicts an exemplary meshed WRF
Figure 6B:
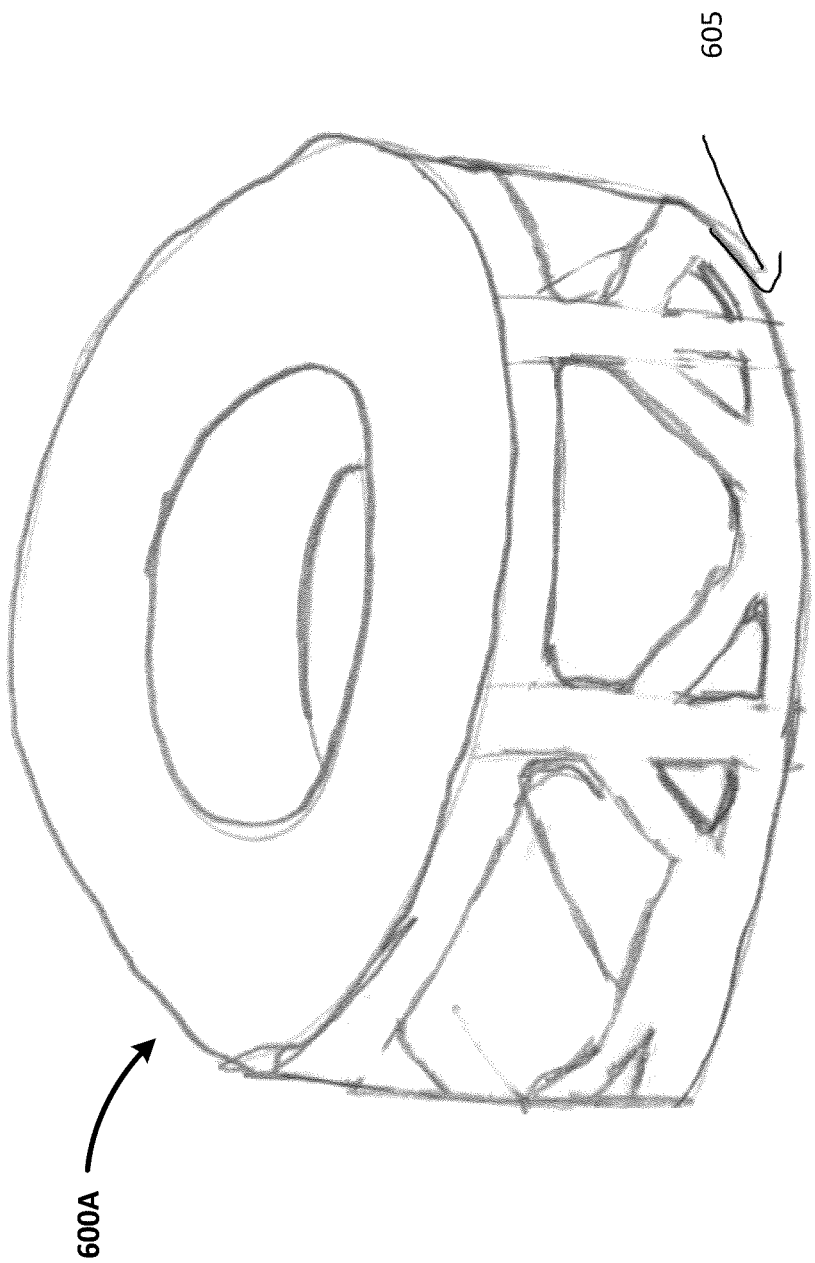
FIG. 6B depicts an exemplary meshed WRF

FIG. 5F depicts an exemplary WRF schematic in a side view. The truss structure 135b of the WRF 135 may, for example, advantageously prevent entrapment of air between the WRF 135 and a bottle (e.g., the bottle 110) and/or a valve (e.g., the valve 160). In some implementations, by way of example and not limitation, the truss WRF 135 may eliminate the need for holes in a wall by (substantially) eliminating a wall of the ferrule (e.g., at least in relation to a bottle neck) in favor of the depicted truss structure.

Ordinary drug containers are not recycled but rather either incinerated or sent to dumps rather than recycled.

In an effort to produce a "greener", i.e. a less wasteful, medical drug container which contains an aluminum ferrule that hold a valve to the container, the WRF includes the design benefits of a ferrule which requires approximately 25% less aluminum to perform the same function as the original existing ferrule without any appreciable reduction in require strength.

The WFR was modeled using solid modeling software, to determine that the original ferrule sees the yield point stress and displacement before deformation at about 2.67 e+07 (FIG. 7) while the "Green" ferrule exhibits deformation at about 2.757e+7, (See FIG. 8) both at approximately the same value.

The "Green" ferrule may, for example, be used to replace the original ferrule without any appreciable sacrifice in strength.

Figure 7:
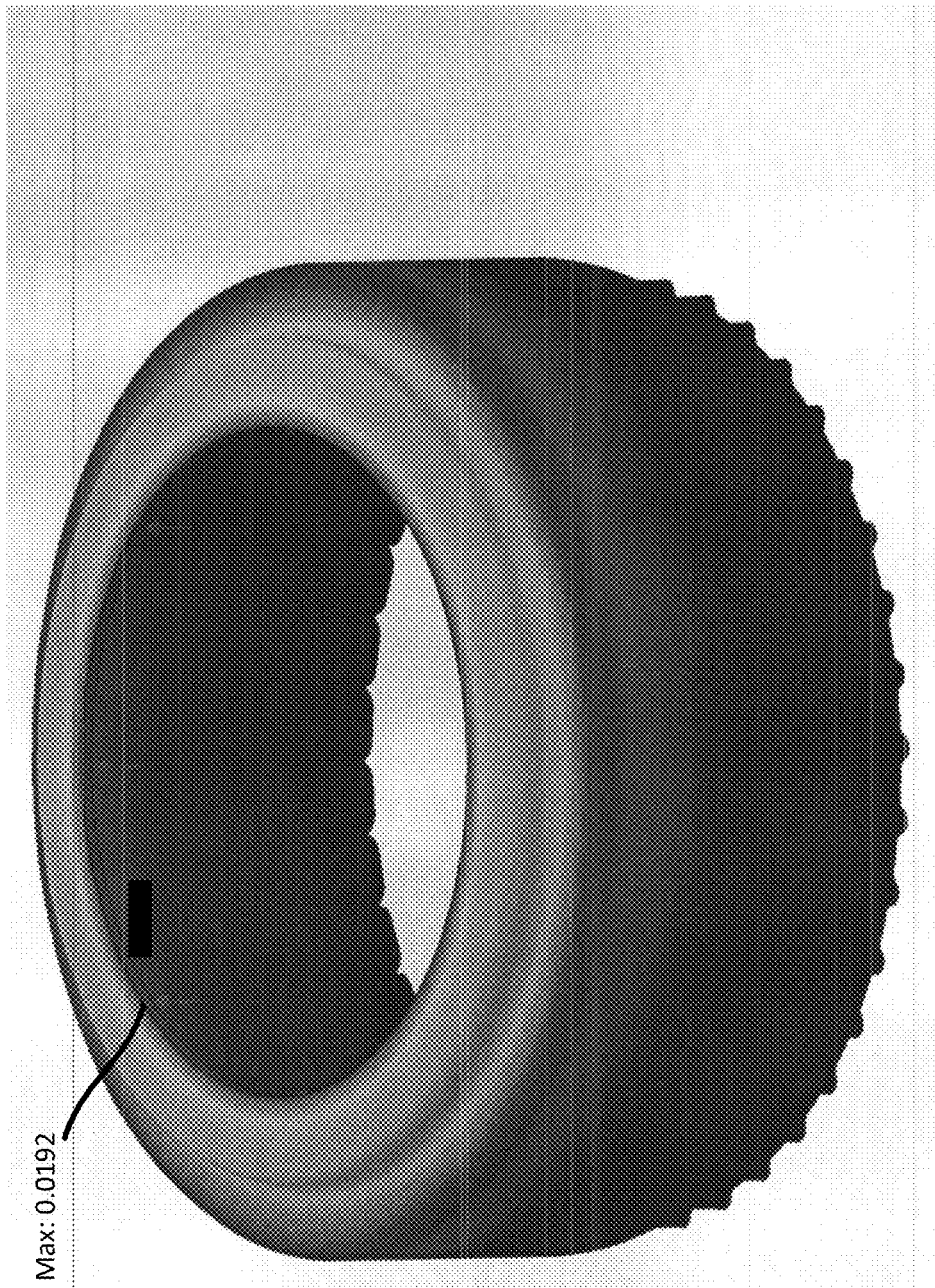
FIG. 7 depicts the tensile strength distribution of an ordinary ferrule.
Figure 8:
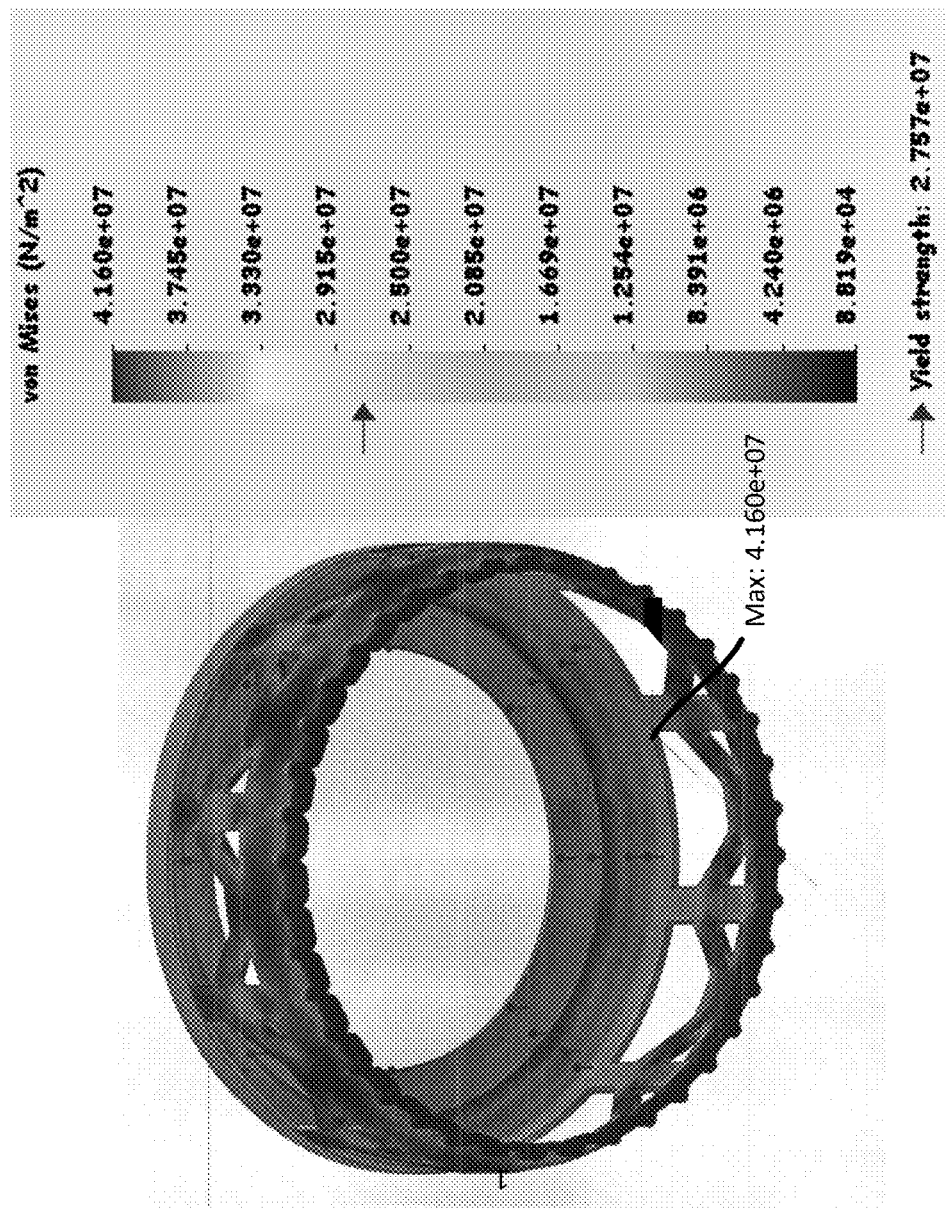
FIG. 8 depicts the tensile strength distribution of an exemplary WRF.
Figure 9A:
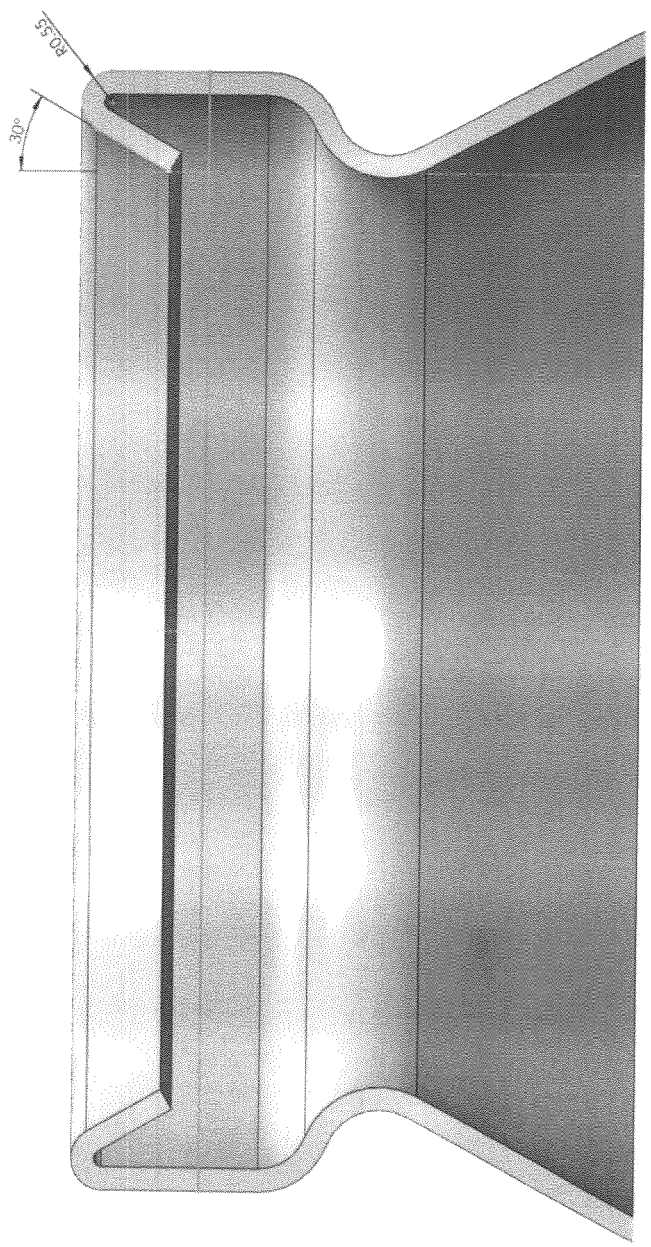
FIG. 9A depicts an exemplary pharmaceutical canister lip.
Figure 9B:
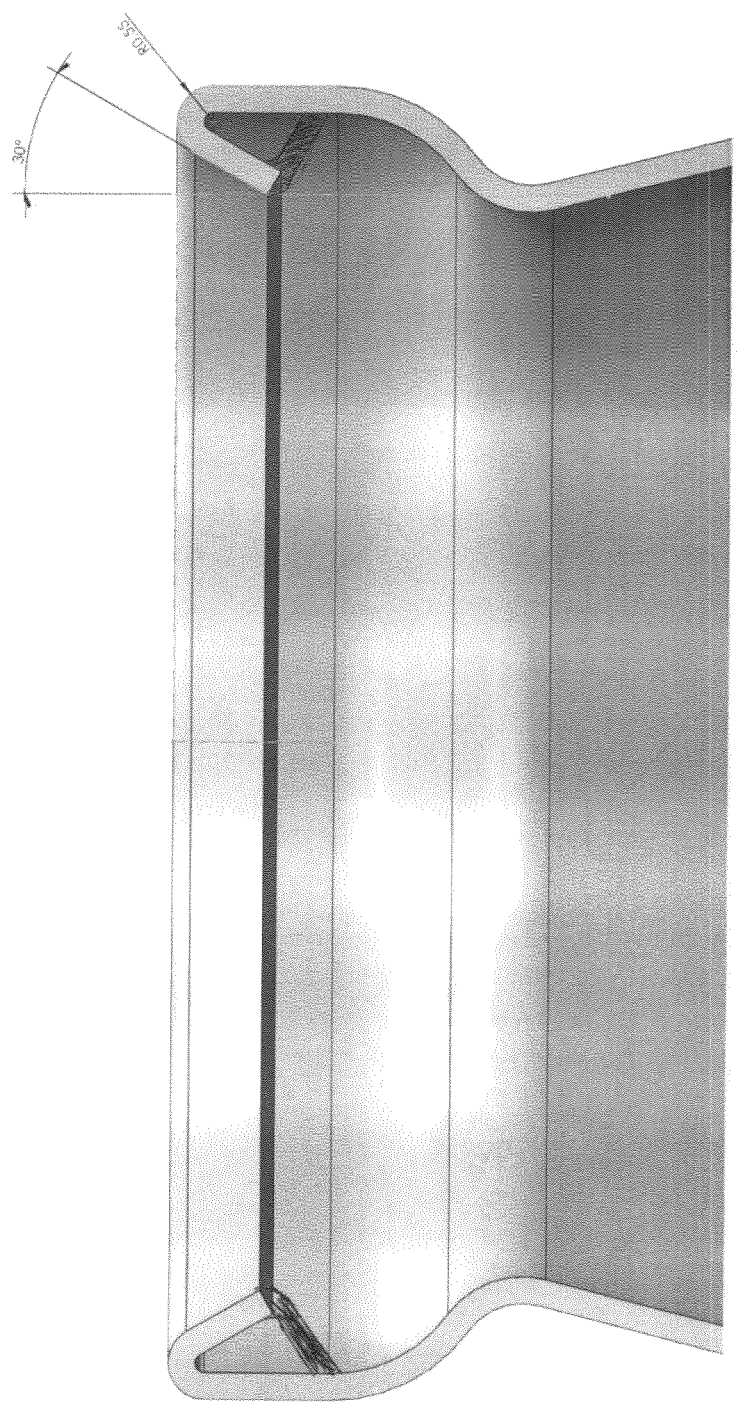
FIG. 9B depicts an exemplary pharmaceutical canister lip.
Figure 9C:
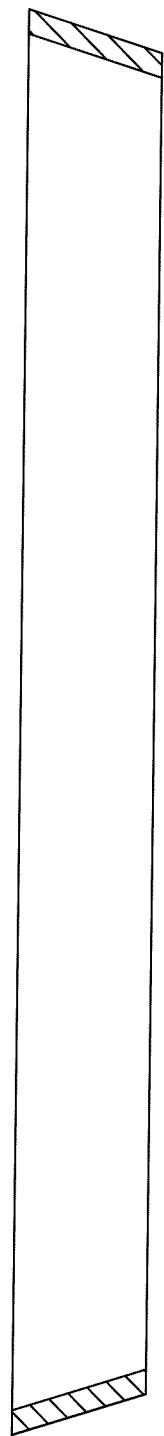
FIG. 9C depicts an exemplary gasket cross-section.

FIG. 7 depicts the tensile strength distribution of an ordinary ferrule and FIG. 8 depicts the tensile strength distribution of an exemplary WRF. The ordinary ferrule may, for example, be compared to the WRF. For example, the original ferrule may be a ferrule before being applied the coring away manufacturing process to manufacture the meshed WRF 300.

In some implementations, the meshed WRF 135a may be made with approximately 25% less aluminum than the original ferrule. In various examples, a weakest area for a ferrule of the anesthetic bottle for deflection may be at a top area.

In some implementations, a tensile strength of the top area may be substantially the same for the original ferrule and the meshed WRF. As shown in FIGS. 7-8, the original ferrule may have an estimated yield point stress and displacement before deformation at about 2.67 e+07 $N/m^2$ at the top area. As shown in FIGS. 7-9, the meshed WRF may have an estimated yield point stress and displacement before deformation at about 2.757e+7 $N/m^2$. Accordingly the meshed WRF may replace the original ferrule without sacrifice in tensile strength in securing the valve assembly to the anesthetic container.

As an illustrative example, solid modeling tests indicate, by way of example and not limitation, that up 26.6% (e.g., 0.58 g) of AlMg3 may be removed from a ferrule (e.g., as shown by FIG. 8 with reference to FIG. 7) without sacrificing required strength for the function of the ferrule (e.g., of the top area responsible, for example, for holding the flange sealingly coupled to the bottle).

An anesthetic container includes a bottle to contain the drug along with a valve assembly to dispense the drug into a vaporizer for heating the drug to body temperature. The drug in at least one case has a relatively low boiling point consequently at storage and distribution temperatures the drug inside the container is both liquid and gaseous states, with the gas exerting pressure against the valve assembly in an effort to escape.

To secure the valve assembly to the container, a ferrule may, for example, be crimped onto the container neck securing the valve assembly to the container. To dispense the drug into a vaporizer used to meter and dispense the drug to the patient, the container's valve assembly may, for example, be inserted into the vaporizer and rotated upward opening an entrance to the vaporizer sump allowing the drug to fill the sump. The ferrule may, for example, be secured to the container sufficiently well to retain the valve assembly to the container preventing it from blowing off the container as well strong enough to allow the container and valve assembly to open the vaporizer filling port with the valve inserted into the vaporizer port and serving as the fulcrum point of the container with attached valve assembly from shifting or dislodging.

Ordinary ferrules are made of metal. Ordinary ferrules are generally disposed of in medical waste which is typically not recycled. Ordinary ferrules are generally difficult to recycle partly because ordinary ferrules are attached to the container and secondly because the valve assembly are composed of multiple different plastics and metals.

The WRF may, for example, reduce material costs. The WRF may, for example, command a premium because it requires less processing than ordinary ferrules. The WRF manufacturing process may, for example, include but is not limited by an addition of die casting to an ordinary ferrule.

The ferrule may be used in a rapid pharmaceutical leakage detection system using a lattice sidewall construction. The modulated bottom profile ferrule does not trap air between the container and the ferrule. So, a vacuum decay test may be performed around the container while simultaneously sealing off the valve stem and/or checking for propellant leakages. Leakages may be determined through chromatography or some other means to measure leakage. The gasket may be made of a thermoplastic elastomer (TPE) or other polymer plastics such as low-density polyethylene (LDPE) or cyclic olefin copolymer (COC). The integrity of the sealing may be inspected through C.T. scans, for example. The procedure of identifying alternative gasket materials eliminates the need for gasket swelling. This may, for example, save a drug manufacturer the expense of storing filled drug containers.

FIGS. 9A-9C depict some exemplary pharmaceutical canister lip embodiments and a cross-sectional view. The exemplary pharmaceutical canister lips may, for example, be manufactured in a manner such that the canister lip be rolled over either with an internal roll or an external roll.

The internal surface of the rolled over lip may, for example, be machined, (ground or skived) to have a flat surface with no radial cracks to the outside. When aluminum is formed, microscopic cracks often may, for example, formed which can provide a leak path for internal pressurized gas to escape.

The exemplary pharmaceutical canister lips are not parallel to the bottom but instead include an angled position in so that the flat surface may, for example, not be prone to denting by other containers package and shipped in bulk from the factory to the packager.

As depicted in FIGS. 2A-2B, the valve corresponding to the exemplary pharmaceutical canister 200 may, for example, include a corresponding matching angle 220. A molded polyethylene gasket 260 (cross-section of gasket is depicted) may, for example, be inserted and crimped between the valve and canister surfaces effecting a leak proof seal. The gasket may, for example, include other material such as wax, polymers, rubbers, a layered sealing, plastics, and/or a layered sealing (e.g., wax, plastic, and/or plastic layered combination).

In some implementations, a gasket may be manufactured (e.g., die cut, stamped, CNC-cut, pressure or thermosformed or injection or compression molded using a one piece or two piece mold) or using sheet material. The sheet material may, for example, include polyethylene sheet.

In some embodiments, a gasket may include (e.g., be made from) polyvinylidene fluoride and/or polyvinylidene difluoride (generally referred to as PVDF, and sometimes by the name of KYNAR) or polyvinylidene chloride (generally referred to as PVDC and sometimes referred to as Saran. A PVDF gasket may, for example, advantageously provide chemical resistance while PVDC or high density polyethylene or combinations of them molded as two shot molding gasket may for example advantageously provide oxygen permeation resistance.

In some embodiments, a gasket may be at least partially made from tetrafluoroethylene (e.g. polytetrafluoroethylene such as TEFLON). In some embodiments, chloroprene (e.g., neoprene) rubber, fluorocarbon-based fluoroelastomer (e.g., VITON) may, for example, be used in gasketing. Low-density polyethylene (LDPE) may, for example, be used in gaskets.

In some embodiments, the ridge, shaped as a V-shape, may, for example, act as a stress concentration feature designed to enhance the structural reliability of the sealing mechanism. This protrusion, which circumscribes the container at the aperture into the container, may, for example, create an elevated region that significantly improves the reliability of sealing. The elevated region may, for example, be precisely aligned with the mating region of the gasket and/or sheet to ensure optimal sealing performance. The V-shaped design may, for example, include a shallow elevation that aids in distributing stress evenly but also facilitates rapid testing of the seal's integrity.

In some embodiments, when the gasket is formed from a sheet material with uniform thickness, coupling with the ridge induces greater axial compression at the outer periphery, may, for example, create a strong seal at this point. This sealing configuration may, for example, permit more rapid and reliable detection of defects, as any failure and/or leakage may, for example, be immediately apparent at the stress-concentrated perimeter. The use of sheet materials may, for example, improve gasket manufacturing, reducing costs while ensuring consistent thickness and performance. The embodiment may, for example, allow for accelerated testing methods. The embodiment may, for example, enhance the durability and effectiveness of the seal and improve the reliability for pharmaceutical container applications.

Figure 10:
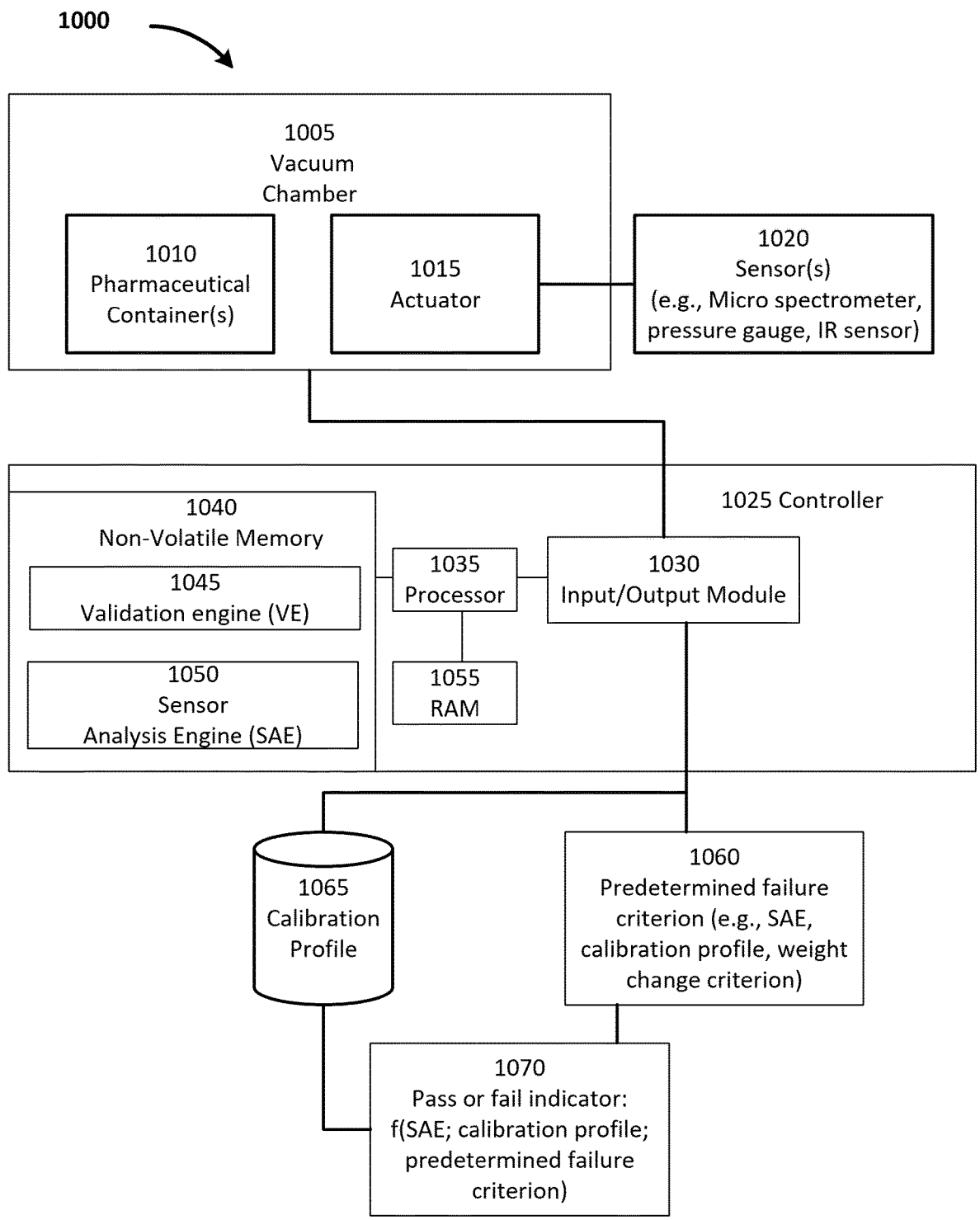
FIG. 10 depicts a functional flowchart of an exemplary rapid pharmaceutical leakage detection validation system.

FIG. 10 depicts a functional flowchart of an exemplary rapid pharmaceutical leakage detection validation system 1000. The exemplary rapid pharmaceutical detection system includes a vacuum chamber 1005. The vacuum chamber 1005 includes a pharmaceutical canister(s) 1010 placed within inside the vacuum chamber. The pharmaceutical canister(s) may, for example, include one canister. The pharmaceutical canister(s) may, for example, include a batch of canisters. The pharmaceutical canister(s) may, for example, include multiple canisters. The canister may, for example, include a weight-reducing ferrule (WRF).

The vacuum chamber 1005 includes an actuator 1015. The actuator may, for example, include a vacuum pump. The vacuum pump may, for example, include a gas transfer pump. The vacuum pump may, for example, include an entrapment pump. The gas transfer pump may, for example, include kinetic gas transfer pumps. The gas transfer may, for example, positive displacement transfer pumps.

The vacuum chamber 1005 includes a sensor. The sensor may, for example, include measure leakage with a mass spectrometer. The sensor may, for example, measure the leakage with a pressure gauge. The sensor may, for example, measure the leakage with an infrared sensor.

One or more sensors may, for example, work together to detect leakage. The sensors together may, for example, decrease the uncertainty of the input data set.

The WRF ferrule may be used in a rapid pharmaceutical leakage detection system using a lattice sidewall construction. The modulated bottom profile ferrule does not trap air between the container and the ferrule. So, a vacuum decay test may be performed around the container while simultaneously sealing off the valve stem and/or checking for propellant leakages.

Leakages may be determined through chromatography or some other means to measure leakage. The gasket may be made of a thermoplastic elastomer (TPE) or other polymer plastics such as low-density polyethylene (LDPE) or cyclic olefin copolymer (COC).

The integrity of the sealing may be inspected through C.T. scans, for example. The procedure of identifying alternative gasket materials eliminates the need for gasket swelling. This may, for example, save a drug manufacturer the expense of storing filled drug containers.

The exemplary rapid pharmaceutical leakage detection validation system 1000 includes a controller 1025. The controller 1025 is connected to the vacuum chamber 1005.

The controller may, for example, include a CPU. The controller may, for example, include a GPU. The controller includes an input and output module 1030. The input and output module 1030 connects to a processor 1035.

The processor 1035 connects to a random-access memory (RAM) 1055. The processor 1035 connects to a non-volatile memory 1040. The non-volatile memory 1040 includes a validation engine 1045. The validation engine may, for example, include software used for testing for leaks. The validation engine may, for example, include software to validate the safety of use of pharmaceutical canisters for consumers. The validation engine may, for example, incorporate requirements from governmental organizations such as the FDA.

The non-volatile memory 1040 includes a sensor analysis engine 1050. The sensor analysis engine may, for example, include software used for analyzing sensor data. The sensor data may, for example, include data relevant to determining the amount of gas released, statistical analysis, and/or indexing. The analysis engine may, for example, include models of the amount of molecules of gas within the vacuum chamber. The sensor data may, for example, include models of the potential leakage based off pressure readings using a pressure gauge. The models may, for example, include the use of multiple pressure gauges located around the vacuum chamber. The sensor analysis engine may, for example, include a set of predetermined decisions based on models. The set of predetermined decisions may, for example, be sent to the processor to operate the actuator and/or sensors within the vacuum chamber.

The controller 1025 is connected to the predetermined failure criterion 1060. The predetermined failure criterion is used to analyzed whether a container failed or passed inspection. The predetermined failure criterion may, for example, include a percentage and/or be based on a standard deviation.

The controller 1025 is connected to a calibration profile 1065. The calibration profile may enable a controller in conjunction with a mass spectrometer to perform a leak detection test of a sealed pharmaceutical canister that determines leakage as a function of a predetermined correlation between a detection of a molecule count of a leaked substance from the canister and a weight change in the canister over a predetermined period of time.

The calibration profile may, for example, enable a controller in conjunction with a controller enable the performance of a gross leak detection test as a function that correlates a vacuum decay pressure change to a visible leak under submersion.

The controller may, for example, include a first calibration mode where the amount of analyte is measured. The amount of analyte measured may, for example, be correlated to the amount analyte detected to weight change. The controller may, for example, generate and store a predetermined calibration profile.

The controller may, for example, include a second calibration mode where the pressure rise within the container is measured. The pressure change may, for example, be corelated to a water test. The processor may, for example, generate and store a predetermined calibration profile. The controller processor may, for example, generate and store a predetermined calibration profile.

The controller 1025 is connected to a pass or fail indicator 1070. The pass or fail indicator may, for example, be a function of the sensor analysis engine (e.g. a mass spectrometer analysis (MSA) engine, a pressure gauge analysis (PGA) engine; and/or an infrared radiation analysis (IRA) engine); the calibration profile (e.g. stored profile and/or newly generated profile). The pass or fail indicator may, for example, be a function of the predetermined failure criterion.

Figure 11:
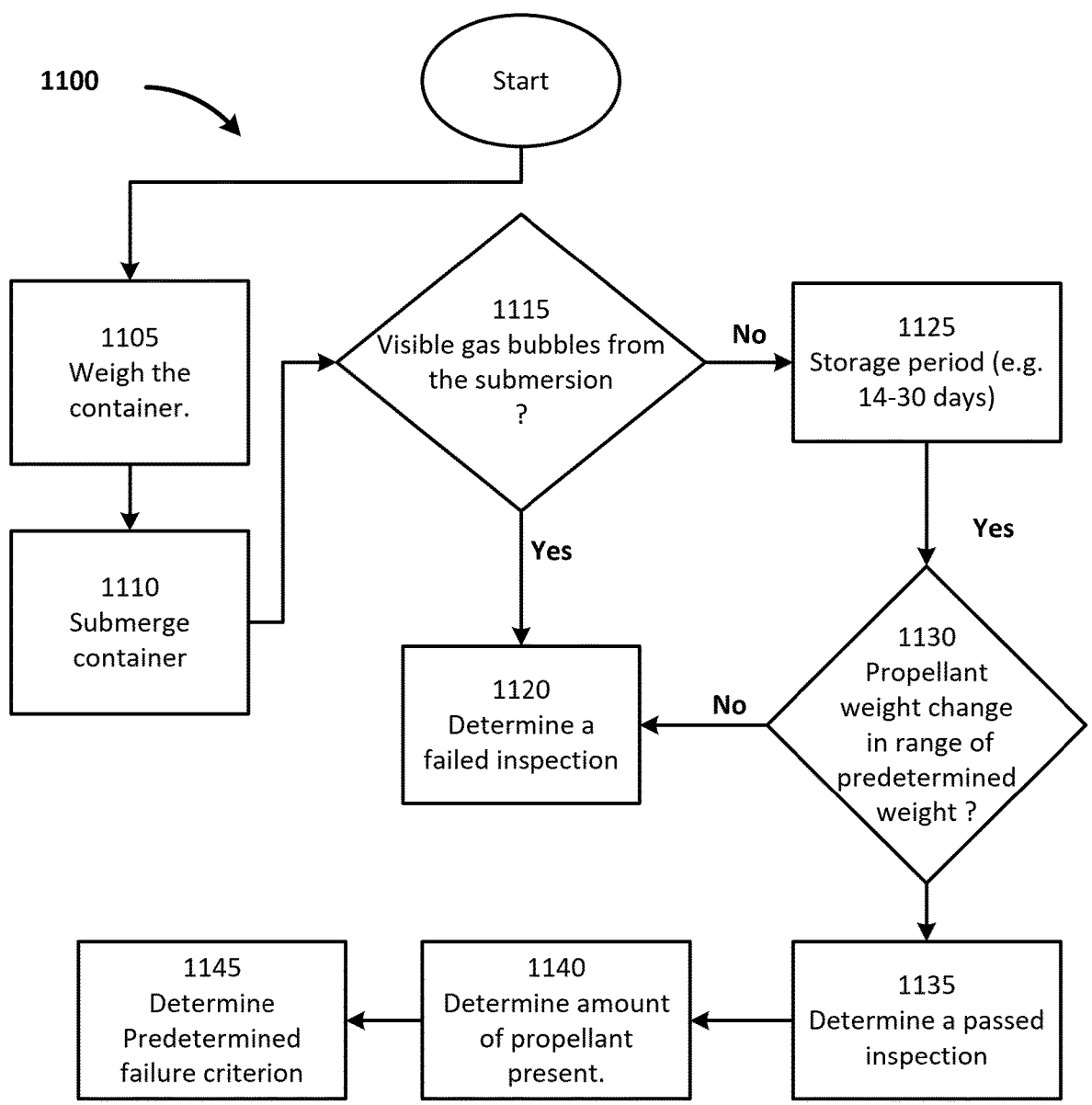
FIG. 11 depicts an exemplary method to determine a threshold criterion for rapid detection of pharmaceutical leakage.

FIG. 11 depicts an exemplary method to determine a threshold criterion for rapidly detect pharmaceutical leakage using an equivalence with the water test.

In step 1105, weigh a container. Next, in step 1105a submerge the container. The container may, for example, include a mix of medicine and/or propellant. The containers are weighed to ensure they meet a minimum weight. The minimum weight may, for example, be the weight of the container, the propellant, and the weight of the medicine.

In step 1110 if gas bubbles emerge from the container being submerged in water, determine the inspection as failed. The container may be moved while submerged from a first end of a water bath to a second end of a water bath. The movement may from the first end to the second end, for example, may cause bubbles if a leakage has occurred. The leak area may, for example, include the valve, the valve container interface, and/or the valve stem.

Next, in step 1115, determine whether the propellant weight change is within the range of a predetermined weight to determine whether an inspection of the container has failed. The container is not weighed while in the water bath but is first taken out and weighed.

In step 1110a, the containers are determined to have either failed from either leaking propellant, and/or taking in water as these factors affect whether the container releases bubbles and/or the mass of the container changes. A label may be generated to label the sample has failed and be placed on the container.

The containers may be resubmerged for after 30 days to check for slow leaks. The number of days may vary. For example, the number of days may be 31 days. For example, the number of days may be 29 days. For example, the number of days may be between 14-28 days to retest the water bath test.

In step 1120, determine a passed inspection if there was no weight change outside a predetermined range and there was no visible gas bubbles.

In step 1125, determine the amount of propellant present in a container that passed inspection. Step 1130 creates a failure threshold criterion based on the amount of propellant in the container after being submerged. The failure threshold criterion may eliminate the need for gasket swelling. The failure threshold criterion may, for example, eliminate the need for inversion of the container after the gasket swelling for 14-28 days. The failure threshold criterion may save manufacturers the expense of storing filled drug containers.

The failure threshold criterion may, for example, be used as a calibration profile in FIG. 10. The validation engine in conjunction with the controller may, for example, communicate with the actuator and sensor to determine whether a pharmaceutical canister passed or failed an inspection based on the failure threshold criterion. The failure threshold criterion may, for example, be used to have the same efficiency of water method of validation without the requirement of storage for 14-28 days.

In some embodiments, the inspection threshold criterions may, for example, indicate whether a propellant of other containers has passed or failed inspection with the use of infrared radiation (I.R.) technology, a vacuum chamber, and/or a sensor. Some implementations may use the equivalency test. The equivalency test tests whether the propellant has been lost or not in the container after being tested. The equivalency test may, for example, determine whether the amount of propellant is the same before and after being submerged in water. The equivalency test may, for example, determine whether the amount of propellant is the same before and after being held for a sustained period in a vacuum.

The rapid pharmaceutical detection leakage system may eliminate some of the following steps from the manufacturing medical containers, such as inhalers. In a first step, a container is filled with a drug. The container may, for example, include a meter dose inhaler and/or other inhalers. The container may, for example, contain medicine. The container is then filed or charged with gaseous propellant in the next step. The container may, for example, be a canister. In the next step, a valve is crimped onto the container. The container is inverted. The inversion is used to soak internal valve gaskets within the container and/or the valve. The valve may, for example, include at least one internal valve gasket. The valve may, for example, include 3 internal valve gaskets. In the next step, the soaked gaskets begin to swell. The containers are then weighed to meet a minimum weight. The weight includes the weight of the canister, medicine, and/or propellant. The containers are stored for 14-28 days inverted. The rapid pharmaceutical detection leakage system may save a drug manufacturer the expense of storing filled containers for the 14-28 days.

Figure 12:
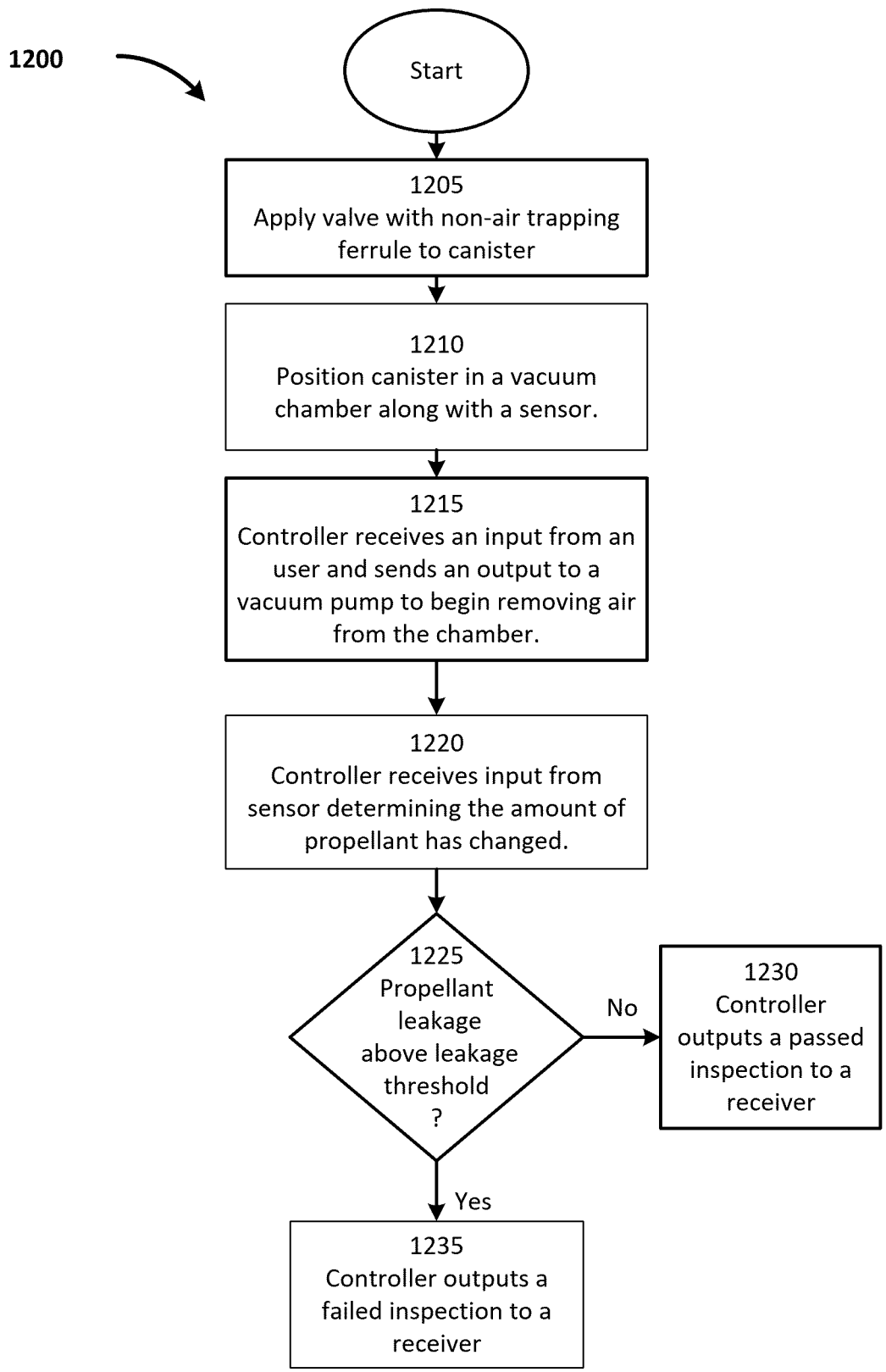
FIG. 12 depicts a method for rapidly detecting pharmaceutical leakage to determine a threshold.
Figure 13:
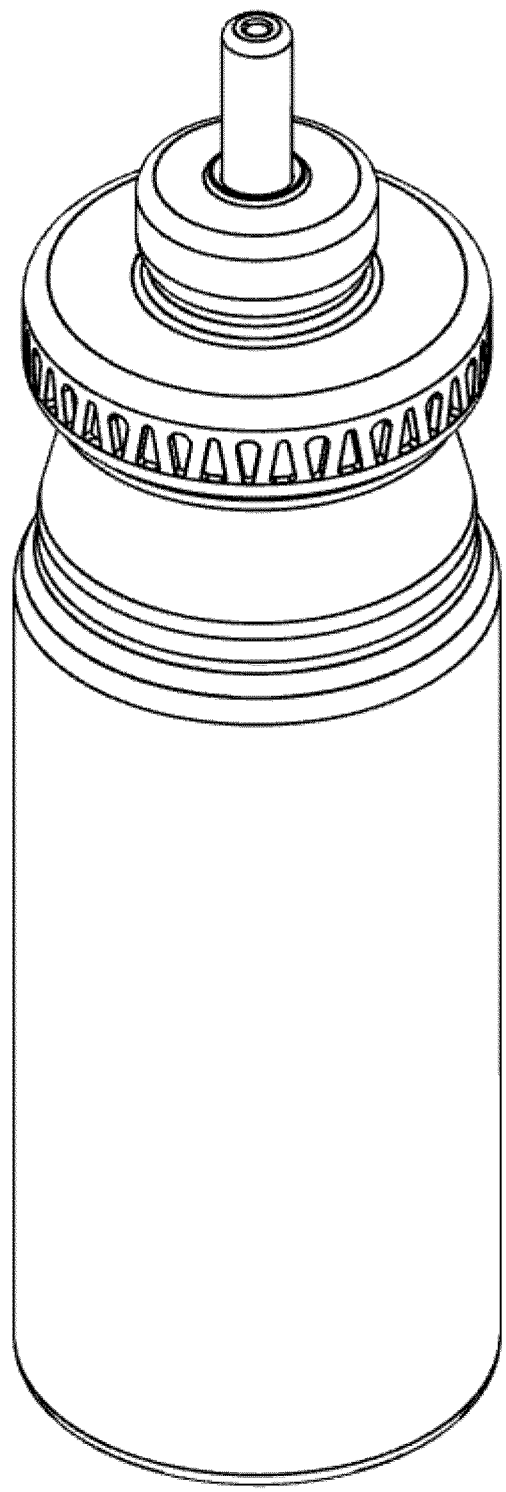
FIG. 13 depicts an exemplary pharmaceutical canister with a weight reduced ferrule assembly perspective view.

FIG. 12 depicts a computer method to rapid detection of pharmaceutical leakage to determine a threshold failure criterion. In step 1205 a non-air trapping ferrule is applied to a container. Step 1205 may, for example, include completion in an assembly line. Step 1205 may, for example, include completion by automation being guided by a controller.

In step 1210, the container is positioned in a vacuum chamber in relationship to a sensor. The non-air trapping ferrule includes a lattice sidewall construction. Step 1210 may, for example, include being completed in an assembly line. Step 1210 may, for example, include being completed by automation being guided by a controller. The sensor may, for example, include an infrared laser sensor. The sensor may, for example, include a spectrometer. The sensor may be a C.T. scan. The sensor may be a chromatography sensor. for example, include any device that measures the amount of propellant released by the container in the vacuum chamber.

In step 1215, the controller receives an input from an input and sends an output to a vacuum pump to begin. The input may, for example, include a user, a sensor, and/or a signal from an assembly line manufacturing switch.

In step 1220, the controller receives input from a sensor determining whether the propellant the amount of propellant has changed. In step 1225, a controller determines whether the propellant leakage was above a leakage threshold. In step 1230, a controller outputs a passed inspection to a input and output module (I/O module) if the amount of propellant leaked is below the leakage threshold.

In step 1235, the controller outputs a failed inspection if the input and output module indicates a propellant leakage greater than the leakage threshold. The propellant amount may, for example, change in the vacuum chamber if the container contains a hole and/or a broken seal.

In some implementations a non-air trapping ferrule may be applied to the container. In some implementations, the container may not be weighed but only be used as a gross test for equivalence. In some implementations, an I.R. scanner may be used to determine whether the inspection of seal has passed or failed.

In some implementations, a vacuum delay test, or other molecule measurement tests, may test for the amount of analyte (propellant) that is below the threshold established by the equivalency test.

FIG. 13 depicts an exemplary pharmaceutical canister with a weight reduced ferrule assembly perspective view.

Figure 14A:
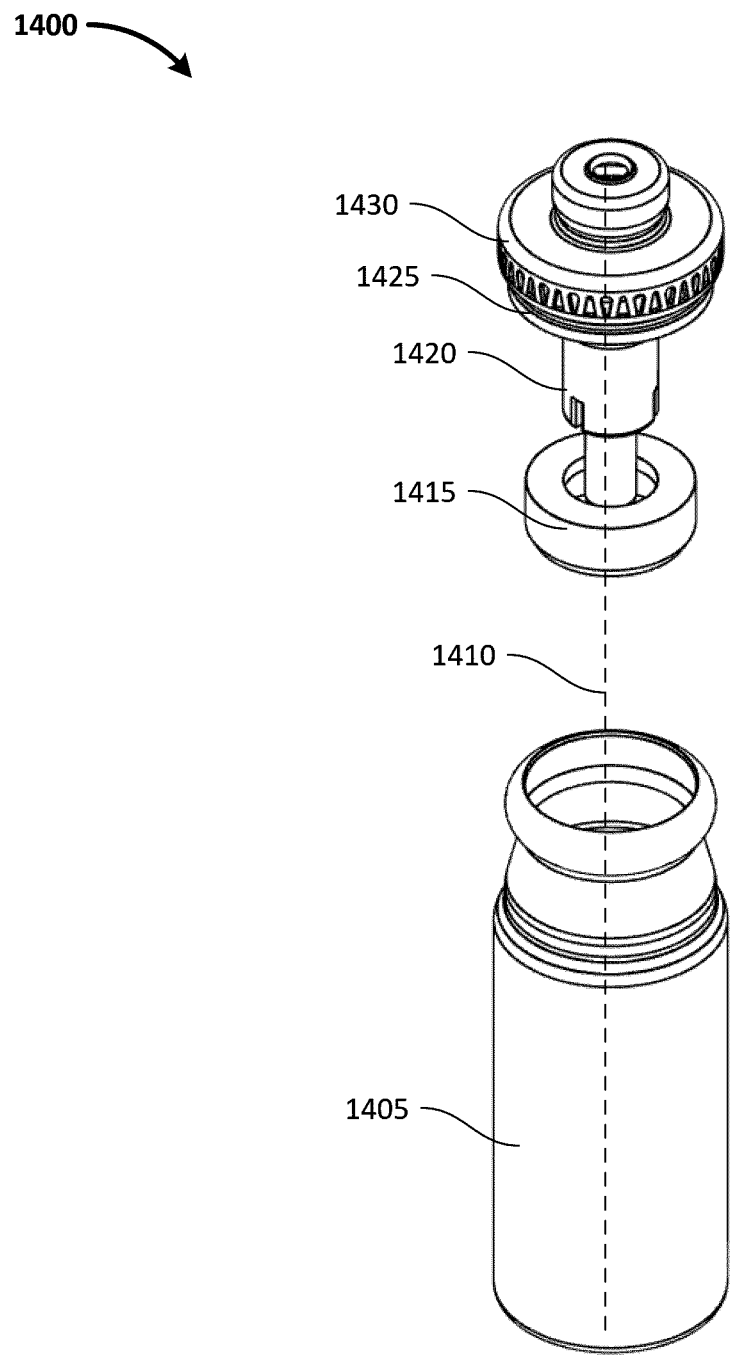
FIG. 14A depicts an exemplary pharmaceutical canister with a weight reduced ferrule assembly view.
Figure 14B:
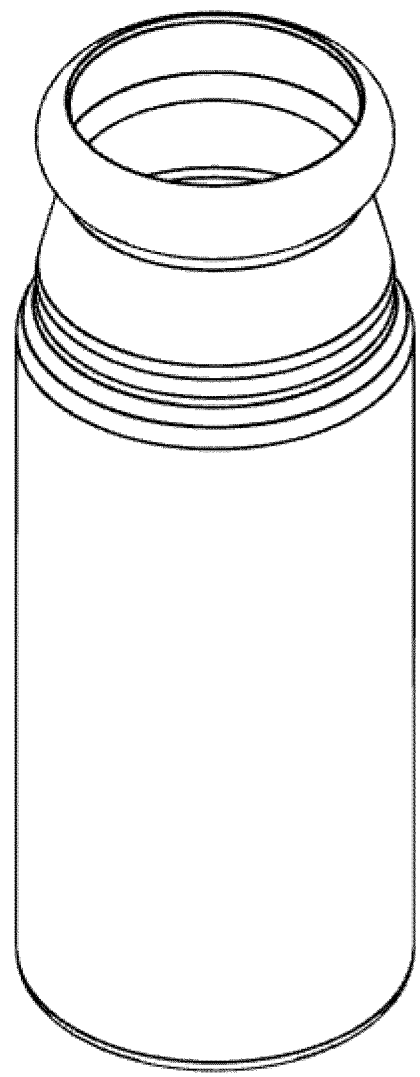
FIG. 14B depicts an exemplary pharmaceutical canister.
Figure 14C:
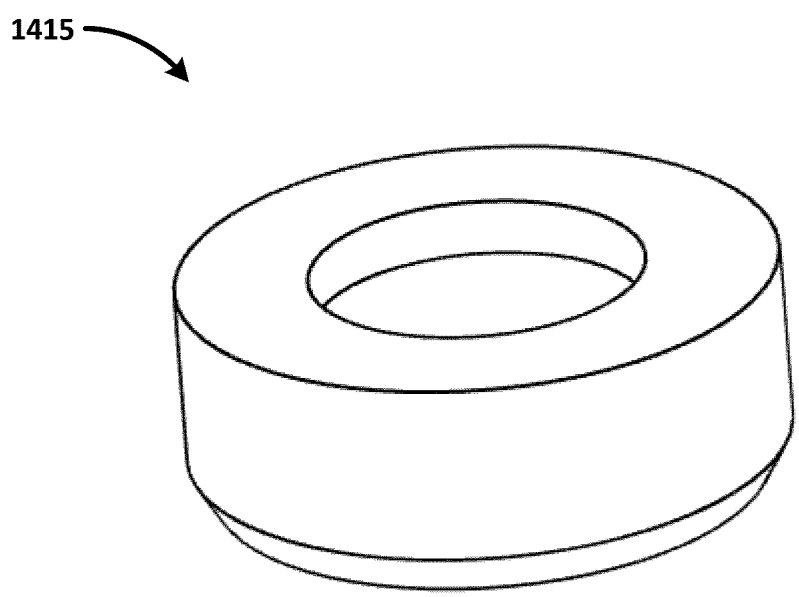
FIG. 14C depicts an exemplary gasket.
Figure 14D:
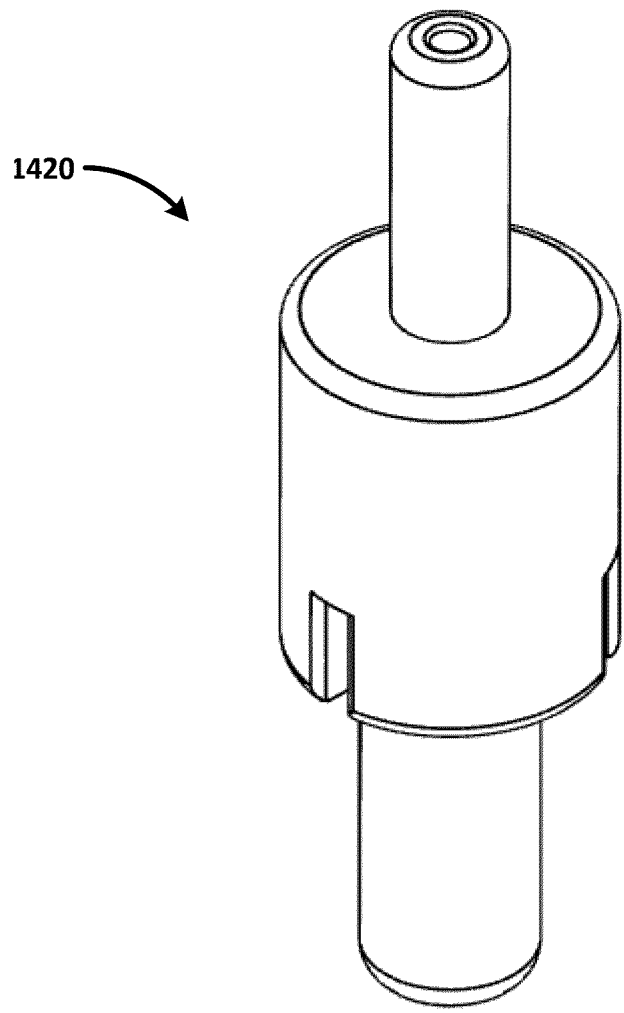
FIG. 14D depicts an exemplary valve.
Figure 14E:
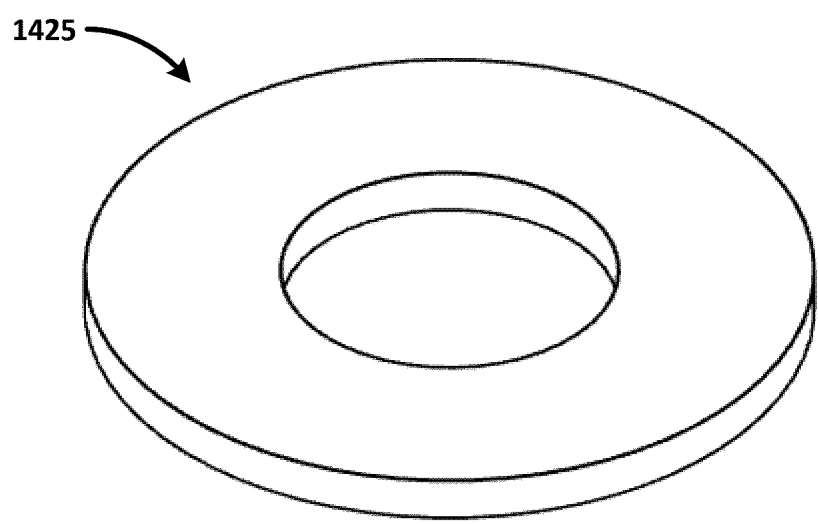
FIG. 14E depicts an exemplary gasket.
Figure 14F:
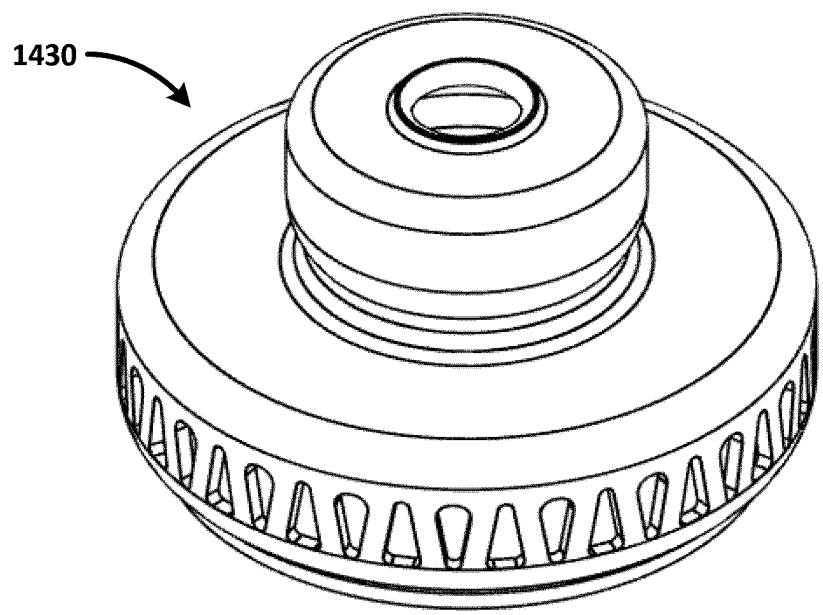
FIG. 14F depicts an exemplary weight reduced ferrule (WFR).

FIG. 14A depicts an exemplary pharmaceutical canister with a weight reduced ferrule assembly view 1400. The weight reduced ferrule assembly view 1400 includes an exemplary pharmaceutical canister 1405 (as depicted in FIG. 4B). The weighted reduced ferrule assembly view 1400 includes an exemplary gasket 1410 (as depicted in FIG. 4C). The weight reduced ferrule assembly view 1400 includes an exemplary valve 1415 (as depicted in FIG. 4D). The weight reduced ferrule assembly view 1400 includes an exemplary valve assembly 1420 (as depicted in FIG. 14D). The weight reduced ferrule assembly view 1400 includes an exemplary sealing member. 1425 The weight reduced ferrule assembly view 1400 includes an exemplary weight reduced ferrule 1430 (as depicted in FIG. 14F).

Figure 15:
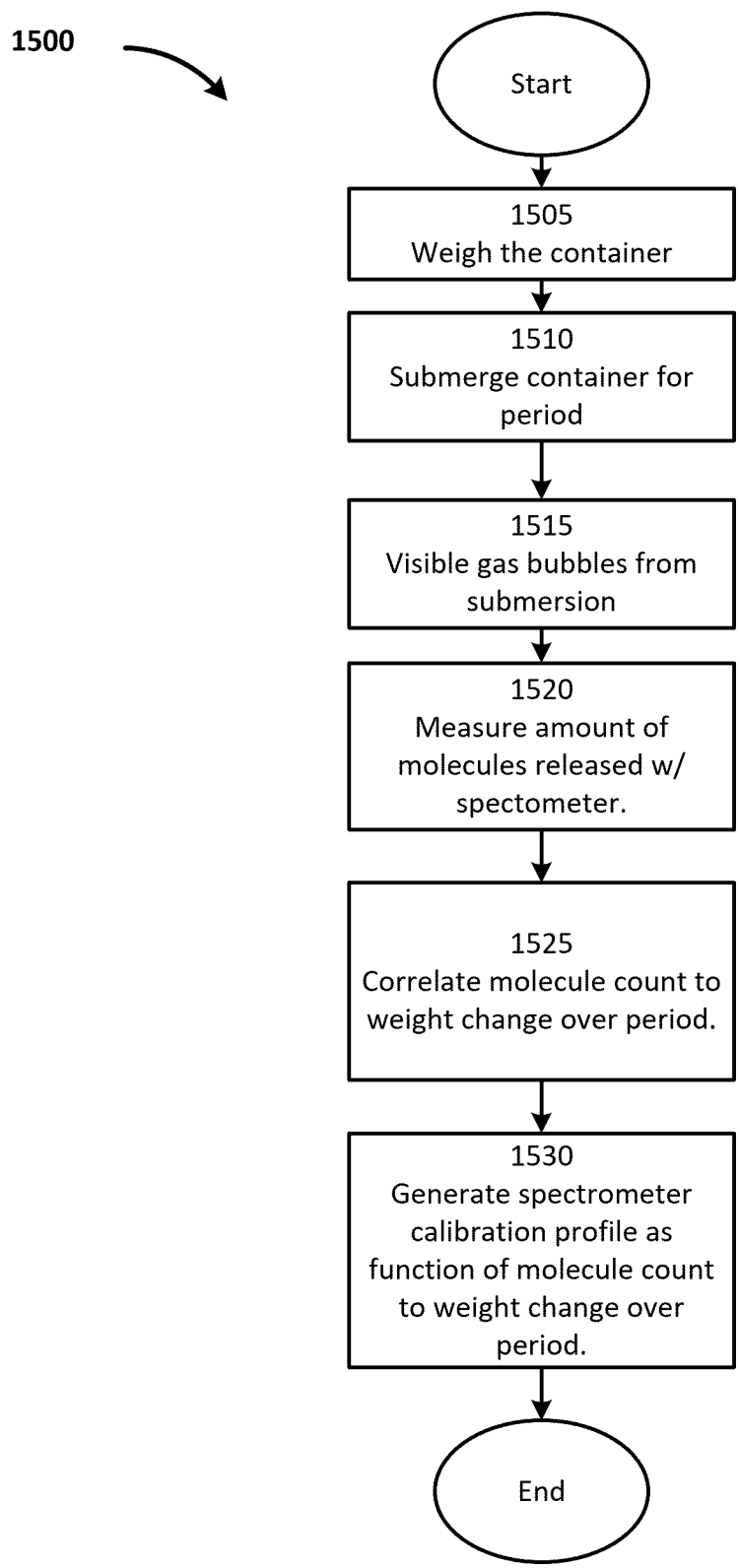
FIG. 15 depicts an exemplary method to generate an exemplary spectrometer calibration profile.

FIG. 15 depicts an exemplary method 1500 to generate an exemplary spectrometer calibration profile. In step, 1505 weigh the pharmaceutical container. The pharmaceutical container may, for example, be sealed. The pharmaceutical container may, for example, include a WRF. In step 1510, submerge the pharmaceutical container for a period. In step 1515, determine visible bubbles from the submersion. The visible bubbles may, for example, may, for example, occur from leaks within the pharmaceutical container. In step 1520, measure the amount of molecules released from the container using a spectrometer. The measurement may, for example, be calculated a spectrometer is used to measure the gas released from the visible bubbles. In step 1525, correlate the molecule count of the gas released to the weight of the container over a period. In step 1530, generate a spectrometer calibration profile as a function of the molecule count to weight change over the period.

Figure 16A:
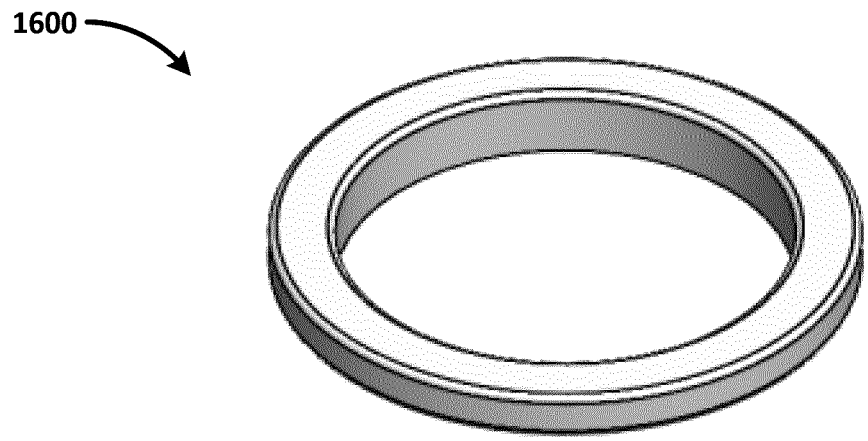
FIG. 16A depicts an upper perspective view of a conical gasket.
Figure 16B:
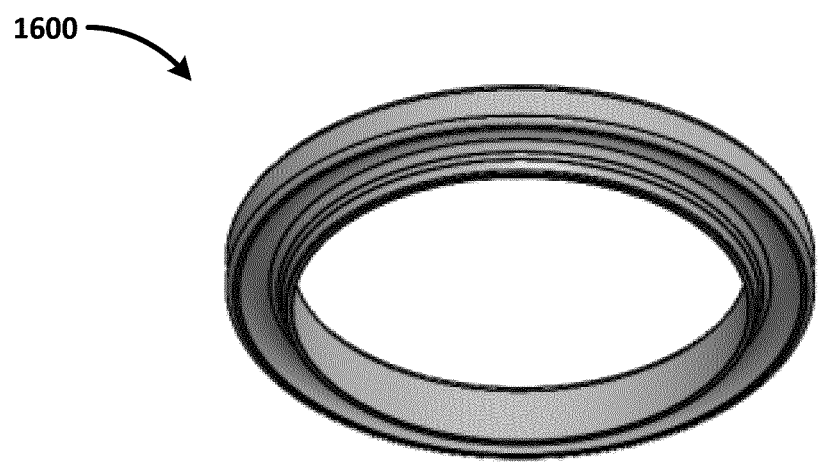
FIG. 16B depicts a lower perspective view of a conical gasket.
Figure 17A:
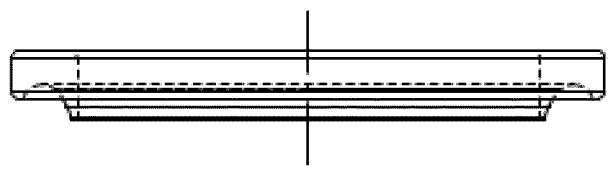
FIG. 17A depicts a side view of the conical gasket.
Figure 17B:
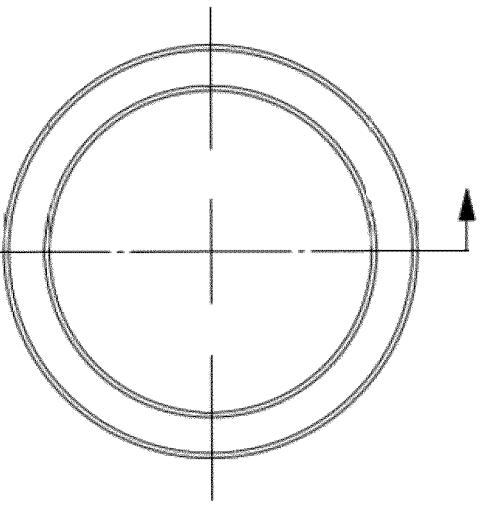
FIG. 17B depicts a top view of the conical gasket.
Figure 18A:
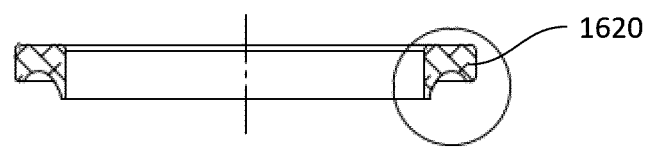
FIG. 18A depicts a cross-section of FIG. 17B

FIG. 16A-16B depicts an upper and lower perspective view of a conical gasket 1600. FIG. 17A depicts a side view 1605 of the conical gasket. FIG. 17B depicts a top view 1610 of the conical gasket. The top view 1610 includes a cross-section 1615. FIG. 18A depicts the cross-section 1615 of FIG. 17B. The cross section 1615 depicts a close-up 1620 of the cross-section of a curvature.

Figure 18B:
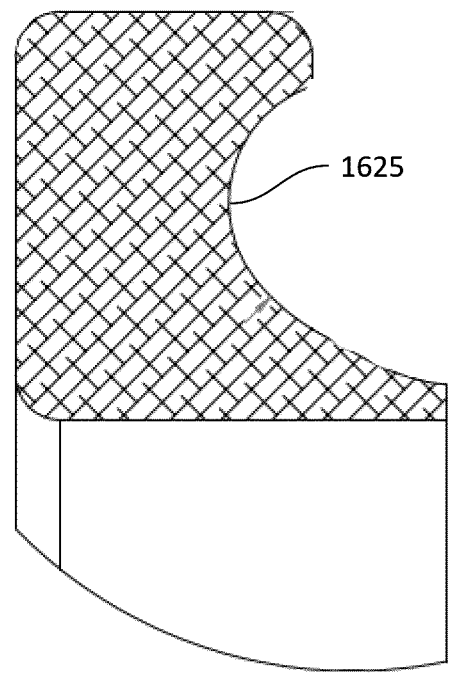
FIG. 18B depicts a close-up view of 18A.

FIG. 18B depicts the close-up view 1620. The close up-view depicts the curvature 1625 of the gasket.

Although various embodiments have been described with reference to the figures, other embodiments are possible.

Although an exemplary system has been described with reference to FIGS., other implementations may be deployed in other industrial, scientific, medical, commercial, and/or residential applications. In some implementations, the WRF may be used for valves of other aerosol containers and metered dose inhalers. In various examples, the WRF may reduce materials used to make the aerosol containers. For example, the WRF may improve precisions of leakage test for the aerosol containers and the metered dose inhalers. For example, the pharmaceutical canister with a lip may, for example, eliminate the needs form redundant parts. For example, the validation system may be used to regulate pharmaceutical containers for medicine to treat diseases, such as asthma.

In various embodiments, some bypass circuits implementations may be controlled in response to signals from analog or digital components, which may be discrete, integrated, or a combination of each. Some embodiments may include programmed, programmable devices, or some combination thereof (e.g., PLAs, PLDs, ASICs, microcontroller, microprocessor), and may include one or more data stores (e.g., cell, register, block, page) that provide single or multi-level digital data storage capability, and which may be volatile, non-volatile, or some combination thereof. Some control functions may be implemented in hardware, software, firmware, or a combination of any of them.

Computer program products may contain a set of instructions that, when executed by a processor device, cause the processor to perform prescribed functions. These functions may be performed in conjunction with controlled devices in operable communication with the processor. Computer program products, which may include software, may be stored in a data store tangibly embedded on a storage medium, such as an electronic, magnetic, or rotating storage device, and may be fixed or removable (e.g., hard disk, floppy disk, thumb drive, CD, DVD).

Although an example of a system, which may be portable, has been described with reference to the above figures, other implementations may be deployed in other processing applications, such as desktop and networked environments.

Temporary auxiliary energy inputs may be received, for example, from chargeable or single use batteries, which may enable use in portable or remote applications. Some embodiments may operate with other DC voltage sources, such as a 9 V (nominal) battery, for example. Alternating current (AC) inputs, which may be provided, for example from a 50/60 Hz power port, or from a portable electric generator, may be received via a rectifier and appropriate scaling. Provision for AC (e.g., sine wave, square wave, triangular wave) inputs may include a line frequency transformer to provide voltage step-up, voltage step-down, and/or isolation.

Although particular features of an architecture have been described, other features may be incorporated to improve performance. For example, caching (e.g., L1, L2, . . . ) techniques may be used. Random access memory may be included, for example, to provide scratch pad memory and or to load executable code or parameter information stored for use during runtime operations. Other hardware and software may be provided to perform operations, such as network or other communications using one or more protocols, wireless (e.g., infrared) communications, stored operational energy and power supplies (e.g., batteries), switching and/or linear power supply circuits, software maintenance (e.g., self-test, upgrades), and the like. One or more communication interfaces may be provided in support of data storage and related operations.

Some systems may be implemented as a computer system that can be used with various implementations. For example, various implementations may include digital circuitry, analog circuitry, computer hardware, firmware, software, or combinations thereof. Apparatus can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Various embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and CD-ROM and DVD-ROM disks. The processor and the memory can be supplemented by, or incorporated in, ASICs (application-specific integrated circuits).

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. Various embodiments may be implemented in a computer system that includes a graphical user interface and/or an Internet browser. To provide for interaction with a user, some implementations may be implemented on a computer having a display device. The display device may, for example, include an LED (light-emitting diode) display. In some implementations, a display device may, for example, include a CRT (cathode ray tube). In some implementations, a display device may include, for example, an LCD (liquid crystal display). A display device (e.g., monitor) may, for example, be used for displaying information to the user. Some implementations may, for example, include a keyboard and/or pointing device (e.g., mouse, trackpad, trackball, joystick), such as by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, the computers and networks forming the Internet, or some combination thereof. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Firewire, ATA/IDE, RS-232, RS-422, RS-485, 802.11 a/b/g, Wi-Fi, Ethernet, IrDA, FDDI (fiber distributed data interface), token-ring networks, multiplexing techniques based on frequency, time, or code division, or some combination thereof. Some implementations may optionally incorporate features such as error checking and correction (ECC) for data integrity, or security measures, such as encryption (e.g., WEP) and password protection.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

Various examples of modules may be implemented using circuitry, including various electronic hardware. By way of example and not limitation, the hardware may include transistors, resistors, capacitors, switches, integrated circuits, other modules, or some combination thereof. In various examples, the modules may include analog logic, digital logic, discrete components, traces and/or memory circuits fabricated on a silicon substrate including various integrated circuits (e.g., FPGAs, ASICs), or some combination thereof. In some embodiments, the module(s) may involve execution of preprogrammed instructions, software executed by a processor, or some combination thereof. For example, various modules may involve both hardware and software.

In an illustrative aspect, a pharmaceutical ferrule 230 may, for example, include a sealing region 235 configured to secure a valve 160 against a pharmaceutical container 145 and having an upper boundary 235a and a lower boundary 235b; an engagement region 240 configured to couple the pharmaceutical container 145 to the pharmaceutical ferrule 230; and a coupling region 245 including multiple tension members 250, wherein, each tension member extends along a curvilinear path 255 to connect the engagement region to the sealing region, and the multiple tension members 250 are configured such that, when the engagement region may, for example, couple to the pharmaceutical container 145 and the coupling region 245 may, for example, couple to the valve 160, a tensile strength of the multiple tension members 250 between the engagement region 240 and the coupling region 245 may, for example, be at least equal to a predetermined value sufficient to retain the valve to the pharmaceutical container 145.

The pharmaceutical container may, for example, include a bottle.

The pharmaceutical container may, for example, include a pharmaceutical canister.

The pharmaceutical canister may, for example, further include a wall defining a cavity extending along a longitudinal axis; and a lip extending into the cavity from a distal end of the wall at a predetermined angle, the lip defining a sealing flat sealing surface extending around an entire perimeter of an aperture into the cavity, the lip configured such that, when a cover may, for example, be disposed to occlude the aperture and coupled to the sealing surface through a sealing member, the sealing surface directly and sealingly contacts a predetermined minimum width of the sealing member around the entire perimeter such that the cavity may, for example, be sealed against an external environment.

The pharmaceutical canister may, for example, include the lip further extending into the cavity such that the wall supports a side of the lip opposite to the sealing surface.

The pharmaceutical canister may, for example, include a pharmaceutical canister that may, for example, couple to a cone-shaped gasket to seal against the valve such that a gas leakage may, for example, be prevented.

The pharmaceutical ferrule may, for example, further include a vaporizer such that the ferrule connects to the valve.

The pharmaceutical ferrule may, for example, be made of aluminum.

The pharmaceutical ferrule may, for example, be crimped onto a neck of a pharmaceutical container.

In an illustrative aspect, a pharmaceutical canister 145 may, for example, include a wall 215 defining a cavity 205 extending along a longitudinal axis 210; and a lip 145*a* extending into the cavity 205 from a distal end of the wall 115 at a predetermined angle 220, the lip 145*a* defining a sealing flat sealing surface extending around an entire perimeter of an aperture into the cavity 205, the lip 145*a* configured such that, when a cover may, for example, be disposed to occlude the aperture and coupled to the sealing surface through a sealing member, the sealing surface directly and sealingly contacts a predetermined minimum width of the sealing member around the entire perimeter such that the cavity may, for example, be sealed against an external environment.

The pharmaceutical canister may, for example, include the lip further extending into the cavity such that the wall supports a side of the lip opposite to the sealing surface.

The pharmaceutical canister may, for example, include the lip where the lip may, for example, be continuous.

The pharmaceutical canister may, for example, include the lip where the lip may, for example, split such that the lip may, for example, be rolled over.

The pharmaceutical canister may, for example, be coupled to a cone-shaped gasket to seal against the valve such that a gas leakage is prevented.

The pharmaceutical canister may, for example, further include an attachment to a pharmaceutical ferrule including: a sealing region configured to secure a valve against the pharmaceutical container and having an upper boundary and a lower boundary; an engagement region configured to couple the bottle to the pharmaceutical ferrule; and a coupling region including multiple tension members, wherein, each tension member extends along a curvilinear path to connect the engagement region to the sealing region, and the multiple tension members may, for example, be configured such that, when the engagement region may, for example, be coupled to the bottle and the coupling region may, for example, be coupled to the valve, a tensile strength of the multiple tension members between the engagement region and the coupling region may, for example, at least equal to a predetermined value sufficient to retain the valve to the pharmaceutical container.

The pharmaceutical ferrule may, for example, further include a vaporizer such that the ferrule connects to the valve.

The pharmaceutical ferrule may, for example, be made of aluminum.

The pharmaceutical ferrule may, for example, be crimped onto a neck of a pharmaceutical container.

In an illustrative aspect, a system for validating a sealing of a pharmaceutical container, the system may, for example, include: a vacuum chamber (1005) configured to apply a negative pressure to at least one pharmaceutical container within the vacuum chamber; a mass spectrometer (1020) in fluid communication with the vacuum chamber; and, a controller (1025) configured to perform validation operations, the validation operations may, for example, apply a negative pressure to the at least one pharmaceutical container; retrieve a spectrometer calibration profile 1065, wherein the spectrometer calibration profile may, for example, include a predetermined correlation 1140 between a molecule count of the spectrometer and a weight change in the pharmaceutical canister over a predetermined period of time; determine, as a function of the spectrometer calibration profile and a detected molecule count by the mass spectrometer of a leaked substance from the pharmaceutical canister, an equivalent weight change in the pharmaceutical canister over the predetermined period of time.

The system may, for example, be configured to perform calibration operations to at least one test pharmaceutical container which seals a gas, the calibration operations may, for example: determine a molecule count of a target substance within the test pharmaceutical container; apply a negative pressure to the test pharmaceutical container; determine a change in molecule count of the target substance in the vacuum chamber; determine a weight change of the pharmaceutical container equivalent to the change in molecule count within the vacuum chamber; generate a predetermined calibration spectrometer profile correlating the change in molecule count to the corresponding weight change; and, store the predetermined calibration spectrometer profile.

The system may, for example, further include a pressure gauge fluidly coupled to the vacuum chamber, wherein the calibration operations further may, for example, include: determine a flow rate sufficient to cause bubbles to be visible when the test pharmaceutical canister is submerged in a fluid; determine a pressure change within the vacuum chamber over a predetermined leakage test time period during which the negative pressure is applied, wherein: the pressure change corresponds to the flow rate, and the pressure change is due to leakage of the target substance from the test pharmaceutical canister; generate a predetermined calibration pressure gauge profile correlating the pressure change to the visibility of bubbles in the fluid, and wherein the validation operations further may, for example, include: determine, as a function of the predetermined calibration pressure gauge profile, and a pressure change of the at least one pharmaceutical container being validated, a corresponding visibility of bubbles in the fluid.

The system may, for example, include the fluid wherein the fluid may, for example, include water.

The system may, for example, include the pharmaceutical canister that may, for example, include a wall defining a cavity extending along a longitudinal axis; and a lip extending into the cavity from a distal end of the wall at a predetermined angle, the lip defining a sealing flat sealing surface extending around an entire perimeter of an aperture into the cavity, the lip configured such that, when a cover may, for example, be disposed to occlude the aperture and coupled to the sealing surface through a sealing member, the sealing surface directly and sealingly contacts a predetermined minimum width of the sealing member around the entire perimeter such that the cavity is sealed against an external environment.

The system may, for example, include a pharmaceutical canister that may, for example, include a pharmaceutical ferrule that may, for example, include: a sealing region configured to secure a valve against a pharmaceutical container and having an upper boundary and a lower boundary; an engagement region configured to couple the bottle to the pharmaceutical ferrule; and a coupling region including multiple tension members, wherein, each tension member extends along a curvilinear path to connect the engagement region to the sealing region, and the multiple tension members may, for example, be configured such that, when the engagement region may, for example, be coupled to the bottle and the coupling region may, for example, be coupled to the valve, a tensile strength of the multiple tension members between the engagement region and the coupling region may, for example, be at least equal to a predetermined value sufficient to retain the valve to the pharmaceutical container.

The system may, for example, include the validation operations that may, for example, further include generating a pass or fail indication as a function of a sensor analysis engine; a calibration profile; and a predetermined failure criterion.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed:

1. A system for validating a sealing of a pharmaceutical container, the system comprising:
   a pharmaceutical ferrule coupled to the pharmaceutical container comprising:
      a sealing region configured to secure a valve against a pharmaceutical container and having an upper boundary and a lower boundary;
      an engagement region configured to couple the pharmaceutical container to the pharmaceutical ferrule; and
      a coupling region comprising multiple tension members, wherein each tension member extends along a curvilinear path to connect the engagement region to the sealing region, and
      the multiple tension members are configured such that, when the engagement region is coupled to the pharmaceutical container and the coupling region is coupled to the valve, a tensile strength of the multiple tension members between the engagement region and the coupling region is at least equal to a predetermined value sufficient to retain the valve to the pharmaceutical container
   wherein gaps between the multiple tension members define flow paths through the pharmaceutical ferrule configured to enable gas leaking from the sealed interface to exit to be detected by a detection sensor;
   a valve assembly comprising the valve situated between the pharmaceutical ferrule and the pharmaceutical container, the valve extending along a central longitudinal axis of the pharmaceutical container and being fluidly communicative between the pharmaceutical ferrule and the pharmaceutical container;
   a gasket positioned between the valve assembly and the sealing region formed from the pharmaceutical container and the pharmaceutical ferrule, the gasket configured to form a gas-tight seal between the valve assembly and the pharmaceutical container;
   a vacuum chamber configured to apply a negative pressure to at least one pharmaceutical container within the vacuum chamber;
   a mass spectrometer comprising the detection sensor in fluid communication with the vacuum chamber; and,
   a controller configured to perform validation operations, the validation operations comprising:
      apply a negative pressure to the at least one pharmaceutical container;
      retrieve a spectrometer calibration profile, wherein the spectrometer calibration profile comprises a predetermined correlation between a molecule count of the spectrometer and a weight change in the pharmaceutical container over a predetermined period; and,
      determine, as a function of the spectrometer calibration profile and a detected molecule count by the mass spectrometer of a leaked substance from the pharmaceutical container, an equivalent weight change in the pharmaceutical container over the predetermined period.

2. The system of claim 1, further configured to perform calibration operations to at least one test pharmaceutical container which seals a gas, the calibration operations comprising:
   determine a molecule count of a target substance within the test pharmaceutical container;
   apply a negative pressure to the test pharmaceutical container;
   determine a change in molecule count of the target substance in the vacuum chamber;
   determine a weight change of the pharmaceutical container equivalent to the change in molecule count within the vacuum chamber;
   generate a predetermined calibration spectrometer profile correlating the change in molecule count to a corresponding weight change; and, store the predetermined calibration spectrometer profile.

3. The system of claim 2, further comprising a pressure gauge fluidly coupled to the vacuum chamber, wherein the calibration operations further comprise:
   determine a flow rate sufficient to cause bubbles to be visible when the test pharmaceutical container is submerged in a fluid;
   determine a pressure change within the vacuum chamber over a predetermined leakage test period during which the negative pressure is applied, wherein: the pressure change corresponds to the flow rate, and the pressure change is due to leakage of the target substance from the test pharmaceutical container;
   generate a predetermined calibration pressure gauge profile correlating the pressure change to the visibility of bubbles in the fluid, and, wherein the validation operations further comprise:
determine, as a function of the predetermined calibration pressure gauge profile, and a pressure change of the at least one pharmaceutical container being validated, a corresponding visibility of bubbles in the fluid.

4. The system of claim 1, wherein the pharmaceutical container comprises a wall defining a cavity extending along the longitudinal axis;
and a lip extending into the cavity from a distal end of the wall at a predetermined angle, the lip defining a sealing flat sealing surface extending around an entire perimeter of an aperture into the cavity, the lip configured such that, when the pharmaceutical ferrule is disposed to occlude the aperture and coupled to the sealing surface through a sealing member, the sealing surface directly and sealingly contacts a predetermined minimum width of the sealing member around the entire perimeter such that the cavity is sealed against an external environment.

5. The system of claim 1, wherein the validation operations further comprise generating a pass or fail indication as a function of a sensor analysis engine; a calibration profile; and a predetermined failure criterion.

* * * * *